(12) United States Patent
Kubotani et al.

(10) Patent No.: US 12,180,047 B2
(45) Date of Patent: Dec. 31, 2024

(54) INDUSTRIAL VEHICLE

(71) Applicant: KABUSHIKI KAISHA TOYOTA JIDOSHOKKI, Kariya (JP)

(72) Inventors: Takehiro Kubotani, Aichi-ken (JP); Taku Mizuki, Aichi-ken (JP); Tomoya Igarashi, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 237 days.

(21) Appl. No.: 17/781,443

(22) PCT Filed: Nov. 12, 2020

(86) PCT No.: PCT/JP2020/042232
§ 371 (c)(1),
(2) Date: Jun. 1, 2022

(87) PCT Pub. No.: WO2021/111839
PCT Pub. Date: Jun. 10, 2021

(65) Prior Publication Data
US 2022/0411246 A1 Dec. 29, 2022

(30) Foreign Application Priority Data

Dec. 3, 2019 (JP) .................. 2019-219036
Aug. 5, 2020 (JP) .................. 2020-132987

(51) Int. Cl.
*B66F 17/00* (2006.01)
*B66F 9/06* (2006.01)
(Continued)

(52) U.S. Cl.
CPC ............ *B66F 17/003* (2013.01); *B66F 9/063* (2013.01); *B66F 9/0755* (2013.01);
(Continued)

(58) Field of Classification Search
None
See application file for complete search history.

(56) References Cited

U.S. PATENT DOCUMENTS

| 8,965,561 B2 * | 2/2015 | Jacobus | G06Q 10/087 |
| | | | 700/229 |
| 9,251,598 B2 * | 2/2016 | Wells | G06V 20/52 |

(Continued)

FOREIGN PATENT DOCUMENTS

| AU | 2020394957 A1 * | 6/2022 | ........ B60W 30/0953 |
| AU | 2021266218 A1 * | 6/2022 | ............... B60Q 1/26 |

(Continued)

OTHER PUBLICATIONS

Examination Search Report issued Sep. 11, 2023 in Canadian App. No. 3,159,403.

(Continued)

*Primary Examiner* — Kevin R Steckbauer
(74) *Attorney, Agent, or Firm* — Sughrue Mion, PLLC

(57) ABSTRACT

A forklift truck includes a main controller, a driving motor, a drive controller, and an object detector. The drive controller controls the driving motor. The object detector detects the position of an object being present in the backward direction of the forklift truck. The main controller derives an expected trajectory of the forklift truck. The main controller imposes a speed limit on the forklift truck by setting a vehicle speed upper limit when the object detected by the object detector is located within the expected trajectory and the forklift truck is traveling in the direction of approaching the object. The main controller gives commands to the drive controller to prevent the vehicle speed of the forklift truck from exceeding the vehicle speed upper limit.

12 Claims, 6 Drawing Sheets

(51) Int. Cl.
    *B66F 9/075*     (2006.01)
    *B66F 9/24*     (2006.01)
    *G05D 1/00*     (2024.01)
    *G06T 7/593*     (2017.01)
    *G08G 1/16*     (2006.01)

(52) U.S. Cl.
    CPC ............ *B66F 9/07572* (2013.01); *B66F 9/24* (2013.01); *G05D 1/0223* (2013.01); *G06T 7/593* (2017.01); *G08G 1/16* (2013.01)

(56) References Cited

U.S. PATENT DOCUMENTS

| | | | | |
|---|---|---|---|---|
| 10,108,200 | B2 * | 10/2018 | Etoh | G05D 1/0246 |
| 10,450,001 | B2 * | 10/2019 | Stewart | B62D 6/10 |
| 11,142,442 | B2 * | 10/2021 | Gault | B66F 9/24 |
| 2004/0154871 | A1 | 8/2004 | Allerding et al. | |
| 2004/0159499 | A1 | 8/2004 | Allerding et al. | |
| 2004/0226776 | A1 | 11/2004 | Allerding et al. | |
| 2012/0078471 | A1 | 3/2012 | Siefring et al. | |
| 2014/0133944 | A1 | 5/2014 | Pangrazio et al. | |
| 2014/0277691 | A1 * | 9/2014 | Jacobus | B66F 9/24 |
| | | | | 700/216 |
| 2015/0294143 | A1 * | 10/2015 | Wells | G06V 40/23 |
| | | | | 348/159 |
| 2015/0294483 | A1 * | 10/2015 | Wells | G06V 20/52 |
| | | | | 382/103 |
| 2015/0294496 | A1 * | 10/2015 | Medasani | G06T 15/205 |
| | | | | 345/420 |
| 2016/0272244 | A1 | 9/2016 | Imai et al. | |
| 2017/0315559 | A1 * | 11/2017 | Etoh | B60K 31/0008 |
| 2018/0057049 | A1 * | 3/2018 | Stewart | B66F 9/063 |
| 2019/0197738 | A1 | 6/2019 | Kishita et al. | |
| 2021/0237719 | A1 | 8/2021 | Chen et al. | |
| 2022/0185171 | A1 * | 6/2022 | Kubotani | G05D 1/0088 |
| 2022/0411246 | A1 * | 12/2022 | Kubotani | G06T 7/593 |
| 2023/0229178 | A1 * | 7/2023 | Kubotani | B60W 50/14 |
| | | | | 701/93 |

FOREIGN PATENT DOCUMENTS

| | | | | |
|---|---|---|---|---|
| AU | 2021336178 A1 * | 3/2023 | ............ | B60W 30/09 |
| CA | 3159403 A1 * | 11/2020 | ........ | B60W 30/0953 |
| CA | 3129132 A1 * | 2/2022 | ............ | G05D 1/0214 |
| CA | 3138158 A1 * | 6/2022 | ............... | B60Q 1/26 |
| CA | 3209773 A1 * | 9/2022 | ........ | B60W 60/0015 |
| CA | 3138158 C * | 10/2023 | ............... | B60Q 1/26 |
| CN | 104136269 A * | 11/2014 | ............. | B60L 15/20 |
| CN | 107650912 A * | 2/2018 | | |
| CN | 109933063 A * | 6/2019 | ............ | B60K 35/00 |
| CN | 110304584 A | 10/2019 | | |
| CN | 114620038 A * | 6/2022 | ............... | B60Q 1/26 |
| CN | 114787073 A * | 7/2022 | ........ | B60W 30/0953 |
| CN | 116018629 A * | 4/2023 | ............ | B60W 30/09 |
| DE | 102019007001 A1 * | 4/2020 | ............... | B60R 1/00 |
| EP | 1447377 A1 * | 8/2004 | ............ | B66F 17/003 |
| EP | 1447377 B1 * | 7/2008 | ............ | B66F 17/003 |
| EP | 2 500 871 A1 | 9/2012 | | |
| EP | 3048021 A1 | 7/2016 | | |
| EP | 4011818 A1 * | 6/2022 | ............... | B60Q 1/26 |
| ES | 2603002 T3 * | 2/2017 | ............... | G08G 1/167 |
| JP | 08-256401 A | 10/1996 | | |
| JP | 11-043299 A | 2/1999 | | |
| JP | 2002-329298 A | 11/2002 | | |
| JP | 2015-81022 A | 4/2015 | | |
| JP | 2015-170284 A | 9/2015 | | |
| JP | 2016-095703 A | 5/2016 | | |
| JP | 2016-139163 A | 8/2016 | | |
| JP | 2017-128277 A | 7/2017 | | |
| JP | 2018-036937 A | 3/2018 | | |
| JP | 2019105995 A * | 6/2019 | | |
| JP | 2019-143484 A | 8/2019 | | |
| JP | 6866839 B2 * | 4/2021 | | |
| JP | 2021093124 A * | 6/2021 | ........ | B60W 30/0953 |
| JP | 2022041629 A * | 3/2022 | ............ | B60W 30/09 |
| JP | 2022094177 A * | 6/2022 | ............... | B60Q 1/26 |
| JP | 2022094178 A * | 6/2022 | | |
| JP | 7439703 B2 * | 2/2024 | ............ | B60W 30/09 |
| JP | 7459716 B2 * | 4/2024 | ........ | B60W 30/0953 |
| WO | WO-2016076148 A1 * | 5/2016 | ........ | B60K 31/0008 |
| WO | WO-2019011522 A1 * | 1/2019 | ........ | B62D 15/0285 |
| WO | WO-2021111839 A1 * | 6/2021 | ........ | B60W 30/0953 |
| WO | WO-2022050036 A1 * | 3/2022 | ............ | B60W 30/09 |

OTHER PUBLICATIONS

Extended European Search Report dated Feb. 7, 2023, issued in European Application No. 20896652.3.

Communication dated Jul. 14, 2022, issued in Indian Application No. 202247030872.

Communication dated Jul. 31, 2024 issued by the Indian Patent Office in application No. 202247030872.

* cited by examiner

FIG. 9

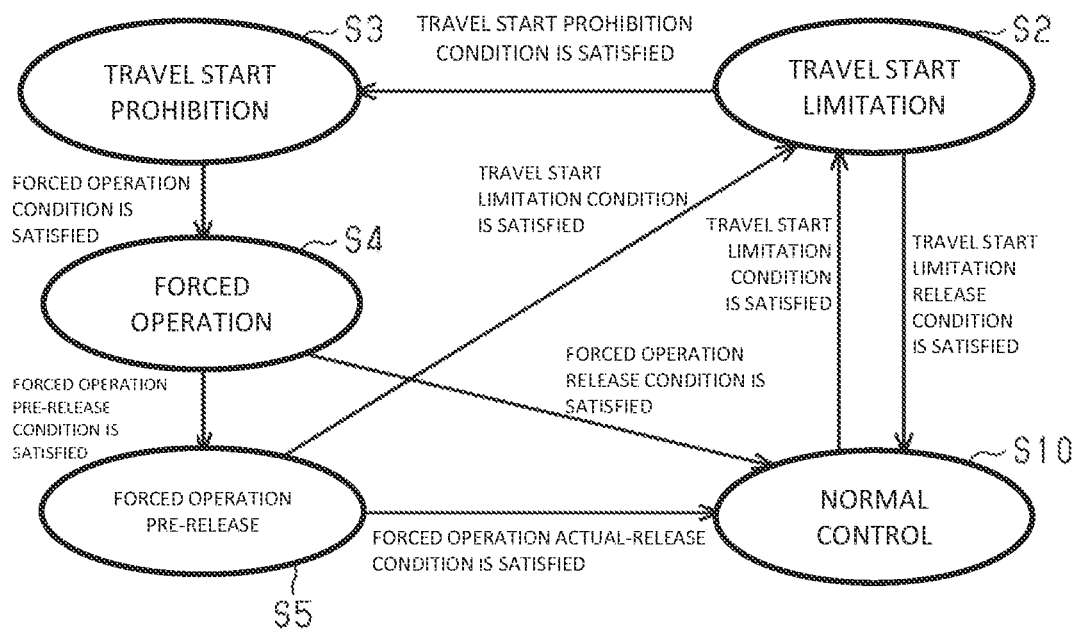

FIG. 10

| CONTROL | STATE | VS UPPER LIMIT | AS UPPER LIMIT | DS UPPER LIMIT |
|---|---|---|---|---|
| | NORMAL CONTROL STATE | NOT LIMITED | NOT LIMITED | NOT LIMITED |
| TRAVEL START LIMITATION CONTROL | TRAVEL START CONTROL STATE | 0 | NOT LIMITED | NOT LIMITED |
| | TRAVEL START PROHIBITION STATE | 0 | NOT LIMITED | NOT LIMITED |
| | FORCED OPERATION STATE | VS1 | NOT LIMITED | NOT LIMITED |
| | FORCED OPERATION PRE-RELEASE STATE | NOT LIMITED | AS1 | NOT LIMITED |
| TRAVEL STOP CONTROL | TRAVEL LIMITATION STATE | 0 | NOT LIMITED | DS1 |
| | TRAVEL LIMITATION PRE-RELEASE STATE | NOT LIMITED | AS2 | NOT LIMITED |
| VEHICLE SPEED LIMITATION CONTROL | LIMITATION RELEASE STATE | NOT LIMITED | NOT LIMITED | NOT LIMITED |
| | LIMITATION START STATE | MAP VALUE | NOT LIMITED | DS2 |
| | LIMITATION PRE-RELEASE STATE | NOT LIMITED | AS3 | NOT LIMITED |

FIG. 11

| OBJECT DETECTABLE RANGE | TRAVEL START LIMITATION ||||||| 
|---|---|---|---|---|---|---|---|
| | FORWARD TRAVEL ||| NEUTRAL | REVERSE TRAVEL |||
| NL | / | / | / | ALL | / | / | LEFT TURNING |
| NL N | / | / | / | ALL | TRAVEL STRAIGHT | RIGHT TURNING | LEFT TURNING |
| N | / | / | / | ALL | TRAVEL STRAIGHT | RIGHT TURNING | LEFT TURNING |
| N NR | / | / | / | ALL | TRAVEL STRAIGHT | RIGHT TURNING | LEFT TURNING |
| NR | / | / | / | ALL | / | RIGHT TURNING | / |
| NL N NR | / | / | / | ALL | TRAVEL STRAIGHT | RIGHT TURNING | LEFT TURNING |
| NL NR | / | / | / | ALL | / | RIGHT TURNING | LEFT TURNING |
| | / | / | / | / | / | / | / |

FIG. 12

| OBJECT DETECTABLE RANGE | NORMAL CONTROL |||||||
|---|---|---|---|---|---|---|---|
| | FORWARD TRAVEL ||| NEUTRAL | REVERSE TRAVEL |||
| NL | RIGHT TURNING | LEFT TURNING | TRAVEL STRAIGHT | / | TRAVEL STRAIGHT | RIGHT TURNING | / |
| NL N | RIGHT TURNING | LEFT TURNING | TRAVEL STRAIGHT | / | / | / | / |
| N | RIGHT TURNING | LEFT TURNING | TRAVEL STRAIGHT | / | / | / | / |
| N NR | RIGHT TURNING | LEFT TURNING | TRAVEL STRAIGHT | / | / | / | / |
| NR | RIGHT TURNING | LEFT TURNING | TRAVEL STRAIGHT | / | TRAVEL STRAIGHT | / | LEFT TURNING |
| NL N NR | RIGHT TURNING | LEFT TURNING | TRAVEL STRAIGHT | / | / | / | / |
| NL NR | RIGHT TURNING | LEFT TURNING | TRAVEL STRAIGHT | / | TRAVEL STRAIGHT | / | / |
| | RIGHT TURNING | LEFT TURNING | TRAVEL STRAIGHT | ALL | TRAVEL STRAIGHT | RIGHT TURNING | LEFT TURNING |

INDUSTRIAL VEHICLE

CROSS REFERENCE TO RELATED APPLICATION

This application is a National Stage of International Application No. PCT/JP2020/042232 filed on Nov. 12, 2020, claiming priorities based on Japanese Patent Application No. 2019-219036 filed on Dec. 3, 2019, and Japanese Patent Application No. 2020-132987 filed on Aug. 5, 2020, the contents of all of which are incorporated herein by reference in their entirety.

TECHNICAL FIELD

The present disclosure relates to an industrial vehicle.

BACKGROUND ART

A vehicle disclosed in Patent Literature 1 has been known as an industrial vehicle used in workplaces such as a factory, a commercial facility, and a harbor. An industrial vehicle includes an accelerator operated by an operator, an accelerator sensor detecting an operation amount of the accelerator, and a controller configured to control a vehicle speed depending on a detection result of the accelerator sensor. The operator of the industrial vehicle can adjust the vehicle speed by adjusting the operation amount of the accelerator.

CITATION LIST

Patent Literature

Patent Literature 1: Japanese Patent Application Publication No. H08-256401

SUMMARY OF INVENTION

Technical Problem

The operator of the industrial vehicle may lower the vehicle speed by adjusting the operation amount of the accelerator when the industrial vehicle approaches a person and an obstacle. When the industrial vehicle is used in a place where many objects such as a person and an obstacle are present, the operator of the industrial vehicle needs to frequently adjust the operation amount of the accelerator, which may reduce operability.

An object of the present disclosure is to provide an industrial vehicle capable of improving operability.

Solution to Problem

An industrial vehicle for solving the above-described problem includes: a drive device; a drive controller configured to control the drive device; and a main controller configured to transmit a command to the drive controller, the drive controller controlling the drive device in response to the command of the main controller to cause the industrial vehicle to travel, wherein the industrial vehicle further includes: an object detector configured to detect a position of an object being present in a traveling direction of the industrial vehicle; an expected trajectory derivation unit configured to derive an expected trajectory as a trajectory on which the industrial vehicle is expected to pass; and a vehicle speed upper limit setting unit configured to impose a speed limit on the industrial vehicle by setting a vehicle speed upper limit when the object detected by the object detector is positioned within the expected trajectory and when the industrial vehicle travels in a direction approaching the object, and the main controller transmits the command to the drive controller so that the vehicle speed of the industrial vehicle does not exceed the vehicle speed upper limit.

The vehicle speed upper limit is set when an object is present within the expected trajectory. The main controller controls the industrial vehicle so as not to exceed the vehicle speed upper limit. The vehicle speed of the industrial vehicle is adjusted so as not to exceed the vehicle speed upper limit even when the operator of the industrial vehicle does not perform a deceleration operation. Thus, operability of the operator of the industrial vehicle can be improved.

In the above-described industrial vehicle, in a state in which an automatic deceleration area is set within an object detectable range of the object detector, the vehicle speed upper limit setting unit may set the vehicle speed upper limit at a lower value when the object is present within the automatic deceleration area and within the expected trajectory, as compared with the vehicle speed upper limit when the object is present within the automatic deceleration area and outside the expected trajectory.

Operability is reduced when an object is present within the automatic deceleration area and the vehicle speed upper limit when an object is present within the expected trajectory is always set. Even when an object is present within the automatic deceleration area, when the object is not present within the expected trajectory, the industrial vehicle allows the vehicle speed higher than the vehicle speed upper limit when the object is present within the expected trajectory, which further improves operability.

In the above-described industrial vehicle, the object detector includes a determiner configured to determine whether the object is a person or an obstacle other than the person, and the vehicle speed upper limit setting unit may set, when the object is determined as a person, the vehicle speed upper limit at a lower value as compared with the vehicle speed upper limit when the object is determined as an obstacle.

When the object detected by the object detector is the obstacle, the vehicle speed upper limit is set at a higher value than the vehicle speed upper limit when the person as the object is present. Thus, the industrial vehicle allows a high vehicle speed, which further improves operability.

In the above-described industrial vehicle, a travel start limitation area is set within the object detectable range of the object detector, the vehicle speed upper limit setting unit may set the vehicle speed upper limit at zero when the object is present within the travel start limitation area and within the expected trajectory, in a stop state of the industrial vehicle.

The vehicle speed upper limit is set at zero, so that the start of traveling of the industrial vehicle is prohibited. When an object is present within the travel start limitation area and within the expected trajectory, the traveling of the industrial vehicle may be blocked. In this case, the start of traveling of the industrial vehicle is prohibited, which prompts the operator to change the traveling direction or operate turning of the industrial vehicle. This prevents blocking of the start of traveling of the industrial vehicle and further improves operability.

In the above-described industrial vehicle, the expected trajectory derivation unit may extend the dimension of the expected trajectory in the traveling direction as the vehicle speed increases.

A time to reach the object becomes short as the vehicle speed of the industrial vehicle increases. Thus, the dimension of the expected trajectory is extended in the traveling direction as the vehicle speed of the industrial vehicle increases, which can appropriately limit the vehicle speed depending on the vehicle speed of the industrial vehicle.

The expected trajectory derivation unit may derive the expected trajectory from a steering angle of the industrial vehicle.

When the industrial vehicle turns, the expected trajectory derivation unit derives the expected trajectory in line with the turning direction of the industrial vehicle due to derivation of the expected trajectory from the steering angle. Accuracy of the expected trajectory to be derived can be improved.

The above-described industrial vehicle may include a cargo handling apparatus on which a cargo is loaded.

For loading the cargo, stability is required for the industrial vehicle on which the cargo is loaded. The stability of the industrial vehicle can be improved by the vehicle speed upper limit being set.

The above-described industrial vehicle may include a weight sensor that detects weight of the cargo loaded on the cargo handling apparatus, and the vehicle speed upper limit setting unit may lower a value of the vehicle speed upper limit as the weight of the cargo increases.

The above-described industrial vehicle may include a lifting height sensor that detects a lifting height of the cargo handling apparatus, and the vehicle speed upper limit setting unit may lower a value of the vehicle speed upper limit as the lifting height of the cargo handling apparatus increases.

Advantageous Effects of Invention

According to the present disclosure, operability can be improved.

BRIEF DESCRIPTION OF DRAWINGS

FIG. 9 is a state shifting diagram of a travel start limitation control.

FIG. 10 is a table of a relationship among shifting states of a main controller, and a vehicle speed upper limit, an acceleration upper limit, and a deceleration upper limit.

FIG. 11 is a table for explaining that a travel start limitation condition is satisfied.

FIG. 12 is a table for explaining that a travel start limitation release condition is satisfied.

DESCRIPTION OF EMBODIMENTS

Hereinafter, an embodiment of an industrial vehicle will be described.

Figure 1:
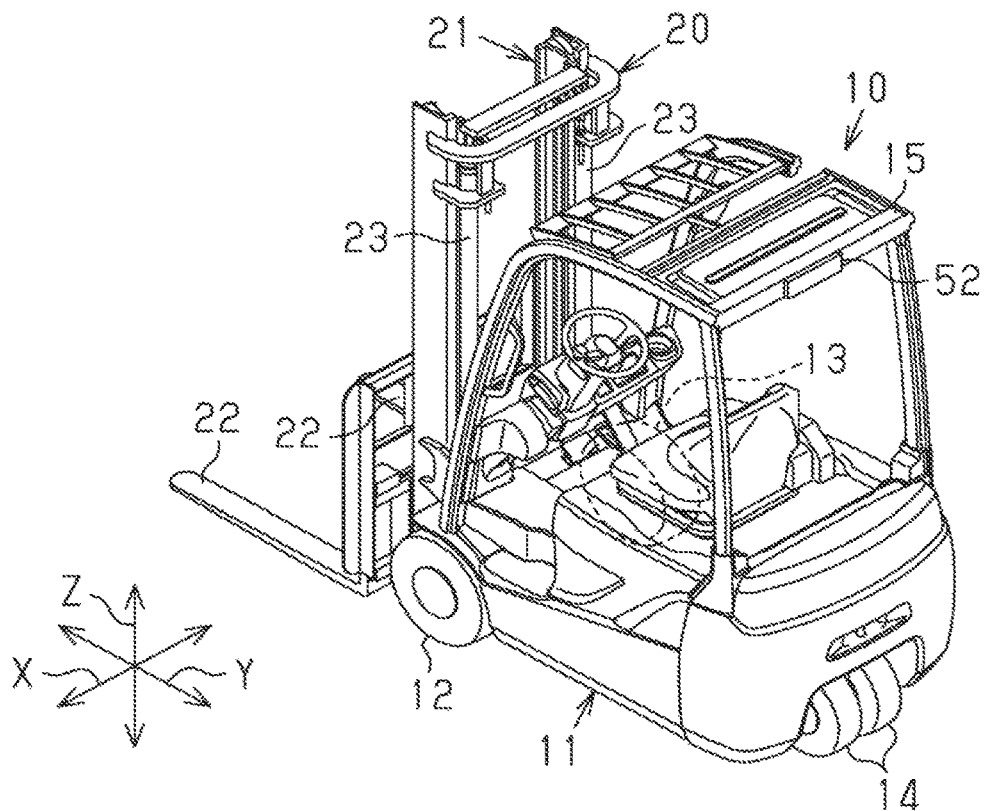
FIG. 1 is a perspective view of a forklift truck.

As illustrated in FIG. 1, a forklift truck 10 serving as an industrial vehicle includes a vehicle body 11, two driving wheels 12 and 13 arranged in a lower front part of the vehicle body 11, two steering wheels 14 arranged in a lower rear part of the vehicle body 11, and a cargo handling apparatus 20. The driving wheels 12 and 13 are spaced from each other in a vehicle width direction. The two steering wheels 14 are adjacent to each other in the vehicle width direction. The two steering wheels 14 are arranged in a central position of the vehicle body 11 in the vehicle width direction, between the driving wheels 12 and 13. When the two steering wheels 14 adjacent to each other are regarded as a set of the steering wheels 14, the forklift truck 10 can be regarded as a three-wheel forklift truck. The vehicle body 11 has a head guard 15 provided above a driver seat. In the following description, terms of "front/rear" and "right/left" indicate directions of the forklift truck 10.

The cargo handling apparatus 20 has a mast 21 provided in a standing manner at a front part of the vehicle body 11, a pair of forks 22 being movable up and down with the mast 21, and a lift cylinder 23 causing the mast 21 to move up and down. A cargo is loaded on the forks 22. The lift cylinder 23 is a hydraulic cylinder. When the mast 21 moves up and down due to extension and retraction of the lift cylinder 23, the forks 22 move up and down accordingly. In the forklift truck 10 of the present embodiment, an operator performs a traveling operation and a cargo handling operation.

Figure 2:
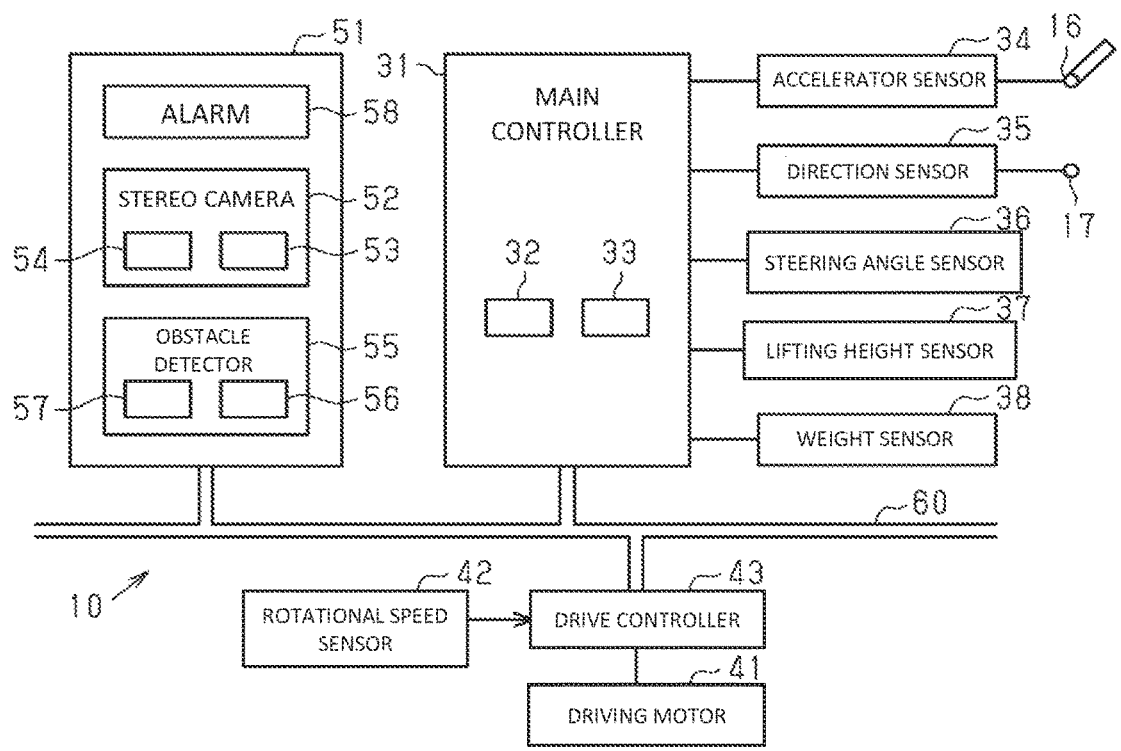
FIG. 2 is a schematic configuration diagram of the forklift truck.

As illustrated in FIG. 2, the forklift truck 10 includes a main controller 31, an accelerator sensor 34, a direction sensor 35, a steering angle sensor 36, a lifting height sensor 37, a weight sensor 38, a driving motor 41, a rotational speed sensor 42, a drive controller 43, an object detector 51, and a bus 60.

The main controller 31 has a processor 32 such as a CPU and a GPU, and a memory 33 including a RAM, a ROM, and the like. The memory 33 stores programs for operating the forklift truck 10. The memory 33 stores program codes or commands configured to cause the processor 32 to execute processes. The memory 33, that is, a computer-readable medium, includes any available medium that is accessible by a general-purpose computer or a dedicated computer. The main controller 31 may include a hardware circuit such as an ASIC (Application Specific Integrated Circuit) or an FPGA (Field Programmable Gate Array). The main controller 31, which is a processing circuit, may include one or more processors for operating in accordance with a computer program, one or more hardware circuits such as the ASIC and the FPGA, or a combination thereof.

The accelerator sensor 34 detects an operation amount of the accelerator 16, that is, an accelerator opening degree. The accelerator sensor 34 outputs an electric signal depending on the accelerator opening degree to the main controller 31. The main controller 31 can recognize the accelerator opening degree based on the electric signal from the accelerator sensor 34.

The direction sensor 35 detects an operation direction of a direction lever 17 instructing a traveling direction. The direction sensor 35 detects whether the direction lever 17 is operated in a direction indicating a forward travel or a direction indicating a reverse travel, with respect to a neutral as a reference position. The direction sensor 35 outputs an electric signal in response to the operation direction of the direction lever 17 to the main controller 31. The main controller 31 can recognize the operation direction of the direction lever 17 based on the electric signal from the direction sensor 35. The main controller 31 can recognize whether the operator instructs the forward travel or the reverse travel, or does not instruct the forward travel or the reverse travel.

The steering angle sensor 36 detects a steering angle of the set of the steering wheels 14. The steering angle sensor 36 outputs an electric signal depending on the steering angle to the main controller 31. The main controller 31 can recognize the steering angle based on the electric signal from the steering angle sensor 36.

The lifting height sensor 37 detects a lifting height of the cargo handling apparatus 20. The lifting height of the cargo handling apparatus 20 is the height of the forks 22 from a road surface. The lifting height sensor 37 is a reel sensor, for example. The lifting height sensor 37 outputs an electric signal depending on the lifting height to the main controller 31. The main controller 31 can recognize the lifting height of the cargo handling apparatus 20 based on the electric signal from the lifting height sensor 37.

The weight sensor 38 detects a weight of a cargo loaded on the cargo handling apparatus 20. The weight sensor 38 is, for example, a pressure sensor detecting a hydraulic pressure of the lift cylinder 23. The weight sensor 38 outputs an electric signal depending on the weight of the cargo to the main controller 31. The main controller 31 can recognize the weight of the cargo based on the electric signal from the weight sensor 38.

The driving motor 41 is a drive device for driving the forklift truck 10 to travel. The driving motor 41 is driven to rotate the driving wheels 12 and 13, which allows the forklift truck 10 to travel.

The rotational speed sensor 42 detects a rotational speed of the driving motor 41. For example, a rotary encoder may be used as the rotational speed sensor 42. The rotational speed sensor 42 outputs an electric signal based on the rotational speed of the driving motor 41 to the drive controller 43.

The drive controller 43 is a motor driver that controls the rotational speed of the driving motor 41. The drive controller 43 can recognize the rotational speed and a rotational direction of the driving motor 41 based on the electric signal of the rotational speed sensor 42. The rotational direction of the driving motor 41 is represented by a sign "+" or "−". The "+" rotational speed indicates a forward rotation, and the "−" rotational speed indicates a reverse rotation.

Each of the two driving wheels 12 and 13 is provided with the driving motor 41, the rotational speed sensor 42, and the drive controller 43. The rotational speed and the rotational direction of each of the two driving wheels 12 and 13 may be independently controllable by controlling the rotational speed and the rotational direction of the driving motor 41 provided independently for each of the two driving wheels 12 and 13 with the drive controller 43. The rotational speed sensor 42 can individually detect the rotational speed of the driving motor 41 provided for each of the two driving wheels 12 and 13.

The object detector 51 includes a stereo camera 52, an obstacle detector 55 detecting an object from an image captured by the stereo camera 52, and an alarm 58. As illustrated in FIG. 1, the stereo camera 52 is disposed in the head guard 15. The stereo camera 52 is disposed so that the road surface on which the forklift truck 10 travels can be seen from above the forklift truck 10. The stereo camera 52 of the present embodiment captures the image of a rear of the forklift truck 10. Thus, the object detected by the obstacle detector 55 corresponds to an object being present behind the forklift truck 10. The alarm 58 and the obstacle detector 55 may be unitized with the stereo camera 52 and disposed in the head guard 15 together with the stereo camera 52. The alarm 58 and the obstacle detector 55 may be disposed at a different position from the head guard 15.

As illustrated in FIG. 2, the stereo camera 52 has two cameras 53 and 54. The cameras 53 and 54 use a CCD image sensor or a CMOS image sensor, for example. The cameras 53 and 54 are arranged so that their optical axes are parallel to each other. Since the cameras 53 and 54 are separated from each other, the same object is shifted in respective images captured by the cameras 53 and 54. Specifically, when the same object is captured, a pixel shift depending on a distance between the two cameras 53 and 54 occurs in the object on respective images captured by the two cameras 53 and 54. Although a wide-angle stereo camera having a horizontal angle of view of 100° or more is used as the stereo camera 52 of the present embodiment, a non-wide-angle stereo camera may be used.

The obstacle detector 55 has a processor 56 such as a CPU and a GPU, and a memory 57 including a RAM and a ROM. The memory 57 stores various programs for detecting an object from images captured by the stereo camera 52. The memory 57 stores program codes or commands configured to cause the processor 56 to execute processes. The memory 57, that is, a computer-readable medium, includes any available medium that is accessible by a general-purpose computer or a dedicated computer. The obstacle detector 55 may include a hardware circuit such as an ASIC (Application Specific Integrated Circuit) or an FPGA (Field Programmable Gate Array). The obstacle detector 55, which is a processing circuit, may include one or more processors for operating in accordance with a computer program, one or more hardware circuits such as the ASIC and the FPGA, or a combination thereof.

The obstacle detector 55 detects an object being present around the forklift truck 10 by repeating the following process in a predetermined control cycle. The obstacle detector 55 derives a position of the detected object. The position of the object is a relative position between the forklift truck 10 and the object.

Figure 3:
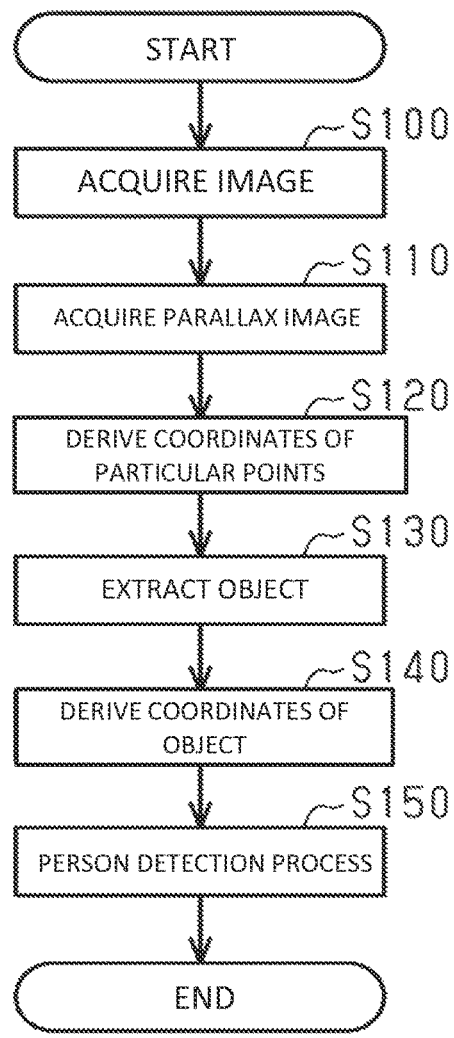
FIG. 3 is a flowchart illustrating a process executed by an obstacle detector.

As illustrated in FIG. 3, in Step S100, the obstacle detector 55 acquires images from the cameras 53 and 54 of the stereo camera 52.

Next, in Step S110, the obstacle detector 55 acquires a parallax image by performing a stereo process. The parallax image is an image in which a parallax [px] is associated with a pixel. The parallax image indicates data in which parallaxes are associated with pixels in the parallax image, and need not be displayed. A parallax is acquired by comparing the images captured by the two cameras 53 and 54 of the stereo camera 52 and calculating a difference in pixel counts between the images for an identical particular point in the images. The obstacle detector 55 uses one of the images captured by the two cameras 53 and 54 as a reference image and the other of the images as a comparison image, and extracts a pixel of the comparison image that is most similar to one of pixels of the reference image for each pixel of the reference image. The obstacle detector 55 calculates differences in pixel counts between the reference image and the comparison image as parallaxes. This can acquire the parallax image in which the parallaxes are associated with the pixels of the reference image. The particular point means a point that can be visually recognized as a border such as an edge of an object. The particular point can be detected from information of brightness, and the like.

Next, in Step S120, the obstacle detector 55 derives coordinates of particular points in a world coordinate system which is a coordinate system in a real space. In the world coordinate system, in a state where the forklift truck 10 is positioned on a horizontal direction, an X-axis corresponds to an axis that extends in a horizontal direction, specifically a vehicle width direction of the forklift truck 10, a Y-axis corresponds to an axis that extends in in the horizontal direction and is perpendicular to the X-axis, and a Z-axis corresponds to an axis that extends in a vertical direction. After the coordinates of the particular points in a camera coordinate system are derived from a baseline length of the stereo camera 52, a focal length of the stereo camera 52, and the parallax image acquired in Step S110, the coordinates derived in the camera coordinate system is converted into the coordinates in the world coordinate system to derive the coordinates of the particular points. As illustrated in FIG. 1, the X-axis, the Y-axis, and the Z-axis are represented by arrows X, Y and Z.

As illustrated in FIG. 3, in Step S130, the obstacle detector 55 extracts an object by clustering the particular points. The obstacle detector 55 defines the particular points assumed to represent the same object, of the particular points each representing a part of the object, as one point group, and extracts the one point group as the object. The obstacle detector 55 performs clustering to recognize the particular points positioned in a predetermined range as one point group based on the coordinates of the particular points in the world coordinate system derived in Step S120. The obstacle detector 55 recognizes the clustered point group as one object. The clustering of the particular points in Step S130 may be performed by various methods.

Next, in Step S140, the obstacle detector 55 derives the coordinates of the object in the world coordinate system. The coordinates of the object can be derived from the coordinates of the particular points forming the point group. The coordinates of the object in the world coordinate system represent a relative position between the forklift truck 10 and the object. Specifically, in the coordinates of the object in the world coordinate system, an X-coordinate represents a distance from an original point to the object in the right-left direction, and a Y-coordinate represents a distance from the original point to the object in the front-rear direction. The original point corresponds to, for example, coordinates in which the X-coordinate and the Y-coordinate represent a position of the stereo camera 52 and a Z-coordinate represents the road surface. Euclidean distance from the position of the stereo camera 52 to the object may be derived from the X-coordinate and the Y-coordinate. The Z-coordinate of the coordinates of the object in the world coordinate system represents a height of the object from the road surface.

Next, in Step S150, the obstacle detector 55 determines whether the object is a person or an obstacle other than a person. Various methods can be used to determine whether the object is a person or not. In the present embodiment, the obstacle detector 55 executes a person detection process for an image captured by one of the two cameras 53 and 54 of the stereo camera 52. The obstacle detector 55 converts the coordinates of the object in the world coordinate system acquired in Step S140 into camera coordinates, and converts the camera coordinates into coordinates in the image captured by the cameras 53 and 54. In the present embodiment, the obstacle detector 55 converts the coordinates of the object in the world coordinate system into coordinates in the reference image. The obstacle detector 55 executes the person detection process for the coordinates of the object of the reference image. The person detection process is executed by, for example, feature extraction and a person determiner in which a machine learning is provided in advance. The extraction of features is executed by methods for the feature extraction of an image in a local area, such as HOG (Histogram of Oriented Gradients) features, and Haar-Like features. For example, a machine to which a machine learning is provided by a supervised learning model is used as the person determiner. The supervised learning model may use a support vector machine, a neural network, a Naive Bayes, a deep learning, or a decision tree, for example. Training data used for the machine learning includes unique image components such as shape elements of a person extracted from an image and appearance elements. The shape elements include, for example a size and an outline of a person. The appearance elements include light source information, texture information, and camera information, for example. The light source information includes information regarding reflectance, shading, and the like. The texture information includes color information, and the like. The camera information includes information regarding an image quality, an image resolution, an angle of view, and the like. Through the process of Step S150, the obstacle detector 55 functions as a determiner that determines whether an object is a person or an obstacle other than a person.

The alarm 58 is a device that issues an alarm to the operator of the forklift truck 10. The alarm 58 includes, for example, a buzzer that issues an alarm with sounds, a lamp that issues an alarm with lights, or combination thereof.

The main controller 31, the drive controller 43, and the object detector 51 can acquire information from each other through the bus 60. The main controller 31, the drive controller 43, and the object detector 51 acquire the information from each other through communication in accordance with a communication protocol for the vehicle, such as CAN (Controller Area Network) or LIN (Local Interconnect Network).

The main controller 31 acquires the rotational speed and the rotational direction of the driving motor 41 from the drive controller 43, and acquires the steering angle from the steering angle sensor 36, thereby deriving the vehicle speed of the forklift truck 10. The vehicle speed of the forklift truck 10 can be derived from the rotational speed and the rotational direction of the driving motor 41 provided in each of the driving wheels 12 and 13, a gear ratio, an outer diameter of each of the driving wheels 12 and 13, the steering angle detected by the steering angle sensor 36, and the like. The main controller 31 derives a traveling direction of the forklift truck 10 as well as the vehicle speed. The traveling direction of the forklift truck 10 is one of a forward direction and a reverse direction. The traveling direction of the forklift truck 10 is indicated by a sign "+" or "−" accompanying with the vehicle speed. The vehicle speed with "+" indicates the forward direction, and the vehicle speed with "−" indicates the reverse direction. The vehicle speed of the present embodiment indicates the vehicle speed without the sign "+" or "−". That is, the vehicle speed of the present embodiment indicates an absolute value of the vehicle speed.

The main controller 31 activates the alarm 58 by transmitting an alarm command through the bus 60. Specifically, the object detector 51 includes an activation portion that activates the alarm 58 upon reception of the alarm command.

Next, a vehicle speed control executed in the forklift truck 10 will be described.

The vehicle speed of the forklift truck 10 is controlled by the main controller 31 depending on a position of an object and a type of the object detected by the object detector 51. The type of the object means that the object is a person or an obstacle other than a person. In the following description, the obstacle corresponds to an object other than a person. The vehicle speed control includes an automatic deceleration control and a travel start limitation control.

Figure 4:
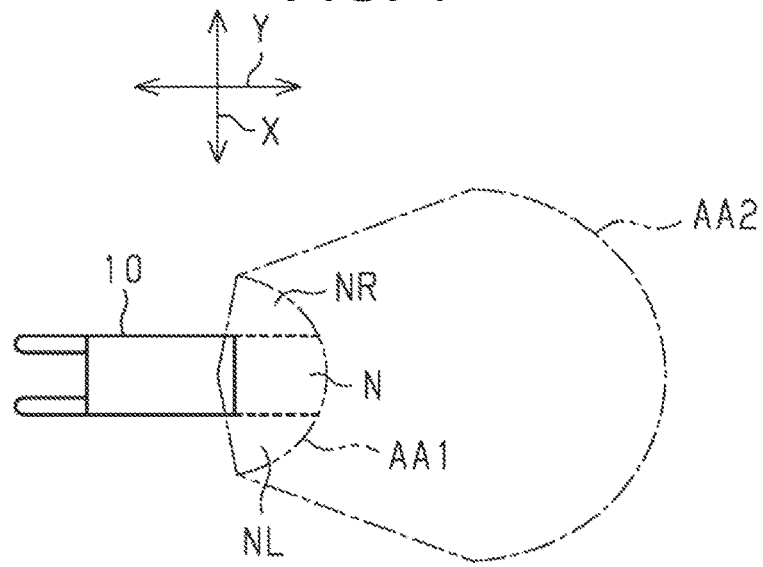
FIG. 4 is a diagram schematically illustrating an automatic deceleration area and a travel start limitation area.

As illustrated in FIG. 4, an automatic deceleration area AA2 used for the automatic deceleration control and a travel start limitation area AA1 used for the travel start limitation control are set within an object detectable range of the object detector 51. The object detectable range of the object detector 51 may be a range that can be captured by the stereo camera 52. In the present embodiment, the automatic deceleration area AA2 is the same area as the object detectable range of the object detector 51. The automatic deceleration area AA2 is an area extending from a position of the stereo camera 52 toward a rear side of the forklift truck 10 and extending in the vehicle width direction of the forklift truck 10. The automatic deceleration area AA2 is an area defined by the X-coordinate and the Y-coordinate in the world coordinate system. The travel start limitation area AA1 is an area set in the automatic deceleration area AA2, and narrower than the automatic deceleration area AA2. The travel start limitation area AA1 is an area extending from a position of the stereo camera 52 toward the rear of the forklift truck 10 and extending in the vehicle width direction of the forklift truck 10. The travel start limitation area AA1 is an area defined by the X-coordinate and the Y-coordinate in the world coordinate system. It can be said that the automatic deceleration area AA2 includes an area away from the forklift truck 10 than the travel start limitation area AA1 does.

In the present embodiment, the travel start limitation area AA1 is divided into three areas which are a central area N, a left area NL positioned on the left of the central area N, and a right area NR positioned on the right of the central area N. The central area N is an area facing the forklift truck 10 in the front-rear direction. The dimension of the central area N in the right-left direction coincides with that of the forklift truck 10 in the vehicle width direction. It can be said that the central area N is an area on which the forklift truck 10 passes while traveling straight in the reverse direction. It can be said that the left area NL is an area on which the forklift truck 10 passes while turning to left in the reverse direction. It can be said that the right area NR is an area on which the forklift truck 10 passes while turning to right in the reverse direction.

Figure 5:
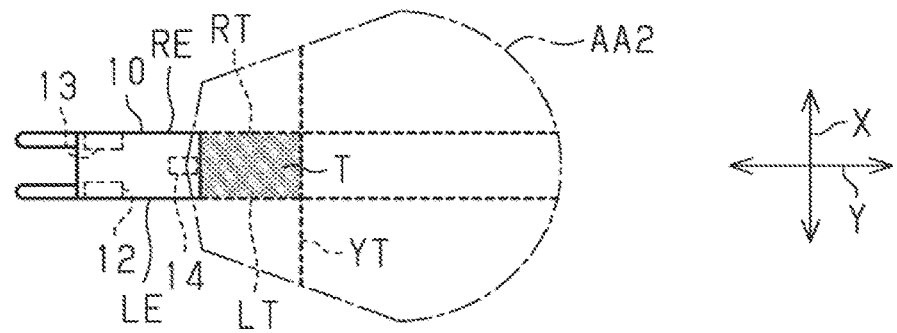
FIG. 5 is a diagram schematically illustrating an expected trajectory.

As illustrated in FIG. 5, the main controller 31 derives an expected trajectory T of the forklift truck 10. The expected trajectory T is a trajectory on which the forklift truck 10 is expected to pass. In the present embodiment, the main controller 31 derives the expected trajectory T on which the forklift truck 10 is expected to pass, when the traveling direction of the forklift truck 10 is in the reverse direction, for example, when the operator operates the direction lever 17 in a direction indicating the reverse travel.

The expected trajectory T can be derived from the steering angle of the steering wheels 14 and dimensional information of the forklift truck 10. The dimensional information of the forklift truck 10 includes the dimension [mm] of the forklift truck 10 from a central axis of the driving wheels 12 and 13 to a rear end of the vehicle body 11, a wheelbase [mm], and a vehicle width [mm]. The dimensional information of the forklift truck 10 can be prestored in, for example, the memory 33 of the main controller 31 because the dimensional information is the known information. The expected trajectory T is a trajectory between a trajectory LT on which a left end LE of the vehicle body 11 passes and a trajectory RT on which a right end RE of the vehicle body 11 passes. The main controller 31 derives the X-coordinate and the Y-coordinate of the expected trajectory T extending in the rear of the forklift truck 10 in the world coordinate system.

Figure 6:
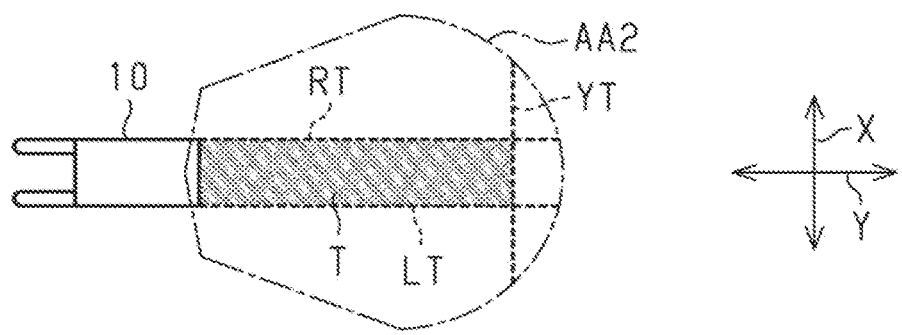
FIG. 6 is a diagram schematically illustrating an expected trajectory when a vehicle speed of the forklift truck increases.
Figure 7:
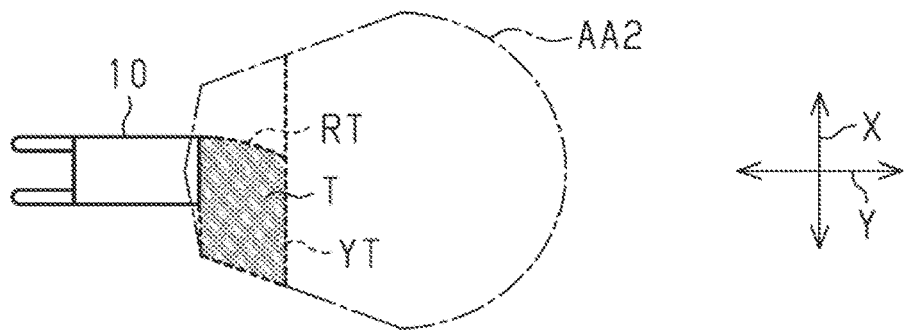
FIG. 7 is a diagram schematically illustrating an expected trajectory when the forklift truck turns.
Figure 8:
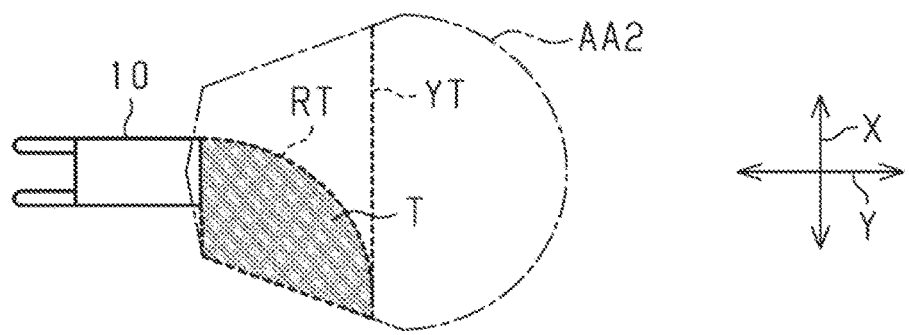
FIG. 8 is a diagram schematically illustrating an expected trajectory when the vehicle speed of the forklift truck increases with the forklift truck turning.

As illustrated in FIG. 5 and FIG. 6, when the forklift truck 10 is traveling straight, the expected trajectory T extends linearly in the reverse direction from the forklift truck 10. As illustrated in FIG. 7 and FIG. 8, when the forklift truck 10 is turning, the expected trajectory T turns in the reverse direction from the forklift truck 10. When the forklift truck 10 is turning right, the expected trajectory T extends rightward. When the forklift truck 10 is turning left, the expected trajectory T extends leftward. It can be said that the main controller 31 derives the expected trajectory T extending in the turning direction when the forklift truck 10 is turning.

The vehicle speed of the forklift truck 10 illustrated in FIG. 6 is higher than that of the forklift truck 10 illustrated in FIG. 5. Similarly, the vehicle speed of the forklift truck 10 illustrated in FIG. 8 is higher than that of the forklift truck 10 illustrated in FIG. 7. As illustrated in FIG. 5 to FIG. 8, the main controller 31 extends the expected trajectory T in the traveling direction as the vehicle speed of the forklift truck 10 increases. In the present embodiment, a trajectory derivation threshold YT changes depending on the vehicle speed. The trajectory derivation threshold YT is a threshold that is set for the Y-coordinate in the world coordinate system. The Y-coordinate represents a position away from the forklift truck 10 as the vehicle speed increases. The main controller 31 derives the expected trajectory T from the forklift truck 10 to the trajectory derivation threshold YT. The expected trajectory T being extended in the traveling direction as the vehicle speed of the forklift truck 10 increases need not have an aspect having a proportional relationship between the vehicle speed of the forklift truck 10 and the length of the expected trajectory T in the traveling direction, and may be simply required to have a correlation in which the expected trajectory T is extended in the traveling direction as the vehicle speed of the forklift truck 10 increases.

The expected trajectory T is derived within the automatic deceleration area AA2. The minimum value of the trajectory derivation threshold YT may correspond to a Y-coordinate in the travel start limitation area AA1 at the farthest position away from the forklift truck 10. That is, the trajectory derivation threshold YT is set so as to derive the expected trajectory T at least within the travel start limitation area AA1 even when the forklift truck 10 stops and the vehicle speed of the forklift truck 10 is zero [km/h]. In the present embodiment, the main controller 31 functions as an expected trajectory derivation unit.

The travel start limitation control will be described. The X-coordinate and the Y-coordinate in the following description indicate those in the world coordinate system.

As illustrated in FIG. 9, in the travel start limitation control, a state of the main controller 31 is set in one of a normal control state S10, a travel start limitation state S2, a travel start prohibition state S3, a forced operation state S4, and a forced operation pre-release state S5, so that the main controller 31 performs controls depending on the above-described states.

As illustrated in FIG. 10, the normal control state S10 is a state in which a vehicle speed limit is not imposed. In the normal control state S10, acceleration and deceleration are also not limited. When the main controller 31 is in the normal control state S10, the main controller 31 calculates a target vehicle speed from an accelerator opening degree detected by the accelerator sensor 34. The main controller 31 calculates a target rotational speed from the target vehicle speed. The target rotational speed is a rotational speed for the forklift truck 10 to reach the target vehicle speed. Target rotational speeds are calculated for two driving motors 41. The main controller 31 determines whether to cause the forklift truck 10 to travel forward or rearward depending on the operation direction of the direction lever 17. The main controller 31 generates a command including information indicative of the target rotational speed and information indicative of the rotational direction of the driving motors 41, and transmits such a command to the drive controller 43. The drive controller 43 controls the driving motors 41 so as to follow the target rotational speed in response to the command. The drive controller 43 controls the driving motors 41 so as to rotate the driving motors 41 in the rotational direction in response to the command. As a result, in the normal control state S10, the forklift truck 10 travels at a vehicle speed depending on the operation amount of the accelerator 16 operated by the operator. As in the present embodiment, in the forklift truck 10 in which the rotational speed of each of the two driving wheels 12 and 13 can be independently controlled, the rotational speed and the rotational direction of each of the two driving motors 41 are adjusted in response to the turning operation by the operator, that is, depending on an angle of the steering wheel, so that the forklift truck 10 turns. Therefore, in the forklift truck 10 that turns utilizing a difference in the rotational speed of the two driving wheels 41, the main controller 31 acquires the target rotational speed depending on the target vehicle speed and the angle of the steering wheel.

The state in which a vehicle speed limit is not imposed includes an aspect in which a vehicle speed upper limit that does not substantially function as the upper limit is set, such as a case where the vehicle speed upper limit is higher than the maximum vehicle speed that is a reachable by the forklift truck 10, in addition to an aspect in which a vehicle speed upper limit is not set. Similarly, the state in which an acceleration limit is not imposed includes an aspect in which an acceleration upper limit that does not substantially function as the upper limit is set, such as a case where the acceleration is higher than the maximum acceleration that is a reachable vehicle speed of the forklift truck 10, in addition to an aspect in which an acceleration upper limit is not set. The deceleration limit is imposed as with the above-described acceleration limit.

As illustrated in FIG. 9, when the main controller 31 is in the normal control state S10 and a travel start limitation condition is satisfied, the main controller 31 is shifted from the normal control state S10 to the travel start limitation state S2. The travel start limitation condition being satisfied means that all of the following conditions A1, A2, and A3 are satisfied.

Condition A1 . . . An object is present in the travel start limitation area AA1.

Condition A2 . . . A detection result of the direction sensor 35 indicates a neutral, or the detection result of the direction sensor 35 indicates a reverse travel and the areas N, NL, and NR where the object is present matches an extending direction of the expected trajectory T.

Condition A3 . . . The forklift truck 10 stops.

The object in the condition A1 may be a person, or an obstacle other than a person. As described above, after the obstacle detector 55 derives the position of the object, the obstacle detector 55 determines whether the object is a person or an obstacle. Since it takes a long time to determine whether the object is a person or not, the obstacle detector 55 may be configured to transmit information on whether the object is a person or not after transmitting information indicative of the position of the object to the main controller 31. Since the main controller 31 can determine that the condition A1 is satisfied at a time of recognition of the position of the object, a determination speed can be improved, as compared with determination of whether or not the condition A1 is satisfied after determination of whether the object is a person or an obstacle. Whether or not the condition A1 is satisfied can be determined based on the X-coordinate and the Y-coordinate of the object. Since the travel start limitation area AA1 is defined by the X-coordinate and the Y-coordinate, presence or absence of the object in the travel start limitation area AA1 can be determined based on the X-coordinate and the Y-coordinate of the object.

A state in which the areas N, NL, and NR where the object is present matches the extending direction of the expected trajectory T may be rephrased as a state in which among the central area N, the left area NL, and the right area NR obtained by dividing the travel start limitation area AA1, an area in which the object is present overlaps the expected trajectory T. That is, this overlapping can be considered as a state in which the object is present within the expected trajectory T. When one object is positioned across the areas N, NL, and NR, or when a plurality of objects is positioned in the different areas N, NL, and NR, the main controller 31 determines that objects are present in the respective areas N, NL, and NR. In this case, when any of the areas N, NL, and NR where the object is present matches the extending direction of the expected trajectory T, the main controller 31 determines that the condition A2 is satisfied.

The condition A1 and the condition A2 can be represented by a table of FIG. 11. FIG. 11 shows a relationship among the areas N, NL, and NR where the object is present, and detection results of the direction sensor 35 and the expected trajectory T when the condition A1 and the condition A2 are satisfied. "ALL" in FIG. 11 indicates that the expected trajectory T may extend in any direction. "LEFT TURNING" in FIG. 11 indicates that the expected trajectory T extends leftward. "RIGHT TURNING" in FIG. 11 indicates that the expected trajectory T extends rightward. As shown in FIG. 11, when the object is present within the travel start limitation area AA1 and the detection result of the direction sensor 35 indicates the neutral, it can be said that the conditions A1 and A2 are satisfied regardless of the extending direction of the expected trajectory T. In a case where an object is present in the left area NL, the conditions A1 and A2 are satisfied when the detection result of the direction sensor 35 indicates the reverse travel and the expected trajectory T extends leftward (that is, left turning), in addition to a case where the detection result of the direction sensor 35 indicates the neutral. In a where an object is present in the left area NL and the right area NR and is not present in the central area N, the conditions A1 and A2 are satisfied when the detection result of the direction sensor 35 indicates the reverse travel, and the expected trajectory T extends rightward or leftward. The forklift truck 10 passes through the central area N even when the forklift truck 10 is turning. Thus, when an object is present in the central area N, the conditions A1 and A2 are satisfied even when the expected trajectory T extends in any direction.

Whether or not the condition A3 is satisfied can be determined by the vehicle speed calculated by the main controller 31. The main controller 31 determines that the forklift truck 10 stops when the vehicle speed is equal to or less than a stop determination threshold [km/h]. The stop determination threshold may be set at a value considered that the forklift truck 10 stops, for example, any value from zero [km/h] to 0.5 [km/h].

As shown in FIG. 10, the travel start limitation state S2 is a state in which the start of traveling of the forklift truck 10 from a stop state is prohibited by the vehicle speed upper limit being set at zero. The start of traveling of the forklift truck 10 means that a state of the forklift truck 10 is shifted from the stop state to a traveling state. When the vehicle speed upper limit is set, the main controller 31 performs control so that the vehicle speed of the forklift truck 10 does not exceed the vehicle speed upper limit. For example, when the target vehicle speed calculated from the accelerator opening degree is less than the vehicle speed upper limit, the main controller 31 calculates the target rotational speed from the target vehicle speed calculated from the accelerator opening degree. On the other hand, when the target vehicle speed calculated from the accelerator opening degree is equal to or more than the vehicle speed upper limit, the main controller 31 calculates the target rotational speed from the vehicle speed upper limit, instead of the target vehicle speed. Then, a command is transmitted to the drive controller 43 so that the target rotational speed coincides with the rotational speed of the driving motor 41. When the vehicle speed upper limit is zero, it can be said that the traveling of the forklift truck 10 is prohibited. In the travel start limitation state S2, the alarm 58 issues an alarm.

As illustrated in FIG. 9, when the main controller 31 is in the travel start limitation state S2 and a travel start limitation release condition is satisfied, the main controller 31 is shifted from the travel start limitation state S2 to the normal control state S10. The travel start limitation release condition being satisfied means that at least one of the following conditions B1, B2, and B3 is satisfied.

Condition B1 . . . No object is present in the travel start limitation area AA1.

Condition B2 . . . The detection result of the direction sensor 35 indicates the forward travel.

Condition B3 . . . The detection result of the direction sensor 35 indicates the reverse travel, and the areas N, NL, and NR where the object is present do not match the extending direction of the expected trajectory T.

The conditions B1, B2, and B3 can be represented by a table in FIG. 12. FIG. 12 shows a relationship among the areas N, NL, and NR where the object is present, and a detection result of the direction sensor 35 and the expected trajectory T when the conditions B1, B2, and B3 are satisfied. The terms of "ALL", "RIGHT TURNING", and "LEFT TURNING" in FIG. 12 indicate the same meaning as in FIG. 11. As shown in FIG. 12, when no object is present in the travel start limitation area AA1, the condition B1 is satisfied regardless of the detection result of the direction sensor 35. Even when the object is present in the travel start limitation area AA1, the condition B2 is satisfied when the detection result of the direction sensor 35 indicates the forward travel. Even when the object is present in the travel start limitation area AA1, the condition B3 is satisfied when the areas N, NL, and NR where the object is present does not match the extending direction of the expected trajectory T. It can be said that the travel start limitation release condition is satisfied by failure in satisfying at least one of the conditions A1 and A2.

As illustrated in FIG. 9, when the main controller 31 is in the travel start limitation state S2 and a travel start prohibition condition is satisfied, the main controller 31 is shifted from the travel start limitation state S2 to the travel start prohibition state S3. The travel start prohibition condition being satisfied means that all the following conditions C1 and C2 are satisfied. When both the travel start prohibition condition and the travel start limitation release condition are satisfied, the main controller 31 prioritizes the travel start limitation release condition and is shifted to the normal control state S10.

Condition C1 . . . The detection result of the direction sensor 35 indicates a position other than the neutral.

Condition C2 . . . The accelerator is ON.

The condition C1 is satisfied when the detection result of the direction sensor 35 indicates the forward travel or the reverse travel. When the detection result of the direction sensor 35 indicates the forward travel in the travel start limitation state S2, which satisfies the condition B2, the state of the main controller 31 is shifted to the normal control state S10. Therefore, it can be said that the condition C1 is satisfied substantially when the detection result of the direction sensor 35 indicates the reverse travel.

"The accelerator is ON" in the condition C2 means that the accelerator 16 has been operated by the operator of the forklift truck 10. The operation of the accelerator 16 is determined by the detection result of the accelerator sensor 34. "The accelerator is ON" includes a play of the accelerator 16, that is, the operation of the accelerator 16 in a dead zone.

As illustrated in FIG. 10, the travel start prohibition state S3 is a state in which the start of traveling of the forklift truck 10 is prohibited by the vehicle speed upper limit being set at zero. It can be said that the travel start prohibition state S3 is a state in which the speed limit is imposed on the forklift truck 10 as in the travel start limitation state S2. In the travel start prohibition state S3 and the travel start limitation state S2, shifting modes to other states, for example, whether to allow the shift to the normal control state S10, are different. In the travel start prohibition state S3, the alarm issued by the alarm 58 may be intensified as compared with the alarm in the travel start limitation state S2. The alarm being intensified means that, for example, in a case where the alarm 58 is a buzzer, the sound of the buzzer is louder, or in a case where the alarm 58 is a combination of a lamp and a buzzer, one of the lamp and the buzzer is switched to both the lamp and the buzzer. That is, this allows the operator to easily recognize that an object is present within the expected trajectory T.

As illustrated in FIG. 9, when the main controller 31 is in the travel start prohibition state S3 and a forced operation condition is satisfied, the main controller 31 is shifted from the travel start prohibition state S3 to the forced operation state S4. The forced operation condition being satisfied means that the following condition D1 is satisfied.

Condition D1 . . . The accelerator is OFF.

"The accelerator is OFF" means that the accelerator 16 is not operated by the operator of the forklift truck 10. It is determined that the accelerator 16 is not operated, based on the detection result of the accelerator sensor 34. It can be said that the condition D1 is satisfied by failure in satisfying the condition C2.

As illustrated in FIG. 10, the forced operation state S4 is a state in which a speed limit is imposed on the forklift truck 10 by the vehicle speed upper limit being set at VS1 [km/h]. The VS1 is higher than zero and lower than the maximum reachable vehicle speed of the forklift truck 10. It can be said that the main controller 31 allows the forklift truck 10 to travel at the VS1 or less. The VS1 is set at an allowable vehicle speed when the forklift truck 10 is in a limp-home mode travel, for example. In the forced operation state S4, the acceleration and the deceleration are not limited. In the forced operation state S4, the alarm issued by the alarm 58 may be smaller than that in the travel start prohibition state S3.

As illustrated in FIG. 9, when the main controller 31 is in the forced operation state S4 and the forced operation release condition is satisfied, the main controller 31 is shifted from the forced operation state S4 to the normal control state S10. The forced operation release condition being satisfied means that all the following conditions E1, E2, and E3 are satisfied.

Condition E1 . . . At least one of the conditions B1, B2, and B3 is satisfied.

Condition E2 . . . The detection result of the direction sensor 35 is different from the previous value.

Condition E3 . . . The forklift truck 10 is traveling.

It can be said that the condition E1 is the same as the travel start limitation release condition. The condition E2 is satisfied when the direction lever 17 is operated and the detection result of the direction sensor 35 is changed from the forward travel to the neutral, from the forward travel to the reverse travel, from the neutral to the forward travel, from the neutral to the reverse travel, from the reverse travel to the neutral, or from the reverse travel to the forward travel. The condition E3 can be determined from the vehicle speed. When the vehicle speed is higher than the stop determination threshold [km/h], the main controller 31 determines that the forklift truck 10 is traveling.

When the main controller 31 is in the forced operation state S4 and a forced operation pre-release condition is satisfied, the main controller 31 is shifted from the forced operation state S4 to the forced operation pre-release state S5. The forced operation pre-release condition being satisfied means that the following condition F1 is satisfied. When both the forced operation release condition and the forced operation pre-release condition are satisfied, the main controller 31 prioritizes the forced operation release condition and is shifted to the normal control state S10.

Condition F1 . . . At least one of the conditions B1, B2, and B3 is satisfied. It can be said that the forced operation pre-release condition is the same as the travel start limitation release condition.

As illustrated in FIG. 10, the forced operation pre-release state S5 is a state in which the acceleration is limited by the acceleration upper limit being set at AS1 [m/s$^2$] while the speed limit is released. The AS1 is higher than zero and lower than the maximum reachable acceleration of the forklift truck 10. The main controller 31 allows the forklift truck 10 to accelerate at the AS1 or less. When the acceleration is limited, the main controller 31 controls the acceleration of the forklift truck 10 so as not to exceed the acceleration upper limit. For example, the main controller 31 transmits a command instructing a target rotational speed and a command instructing a target acceleration to the drive controller 43. The drive controller 43 controls the rotational speed of the driving motor 41 so that the acceleration of the forklift truck 10 becomes the target acceleration, depending on the target rotational speed and the target acceleration. When the acceleration upper limit is set, the main controller 31 transmits the acceleration upper limit as the target acceleration to the drive controller 43. As a result, the main controller 31 imposes the acceleration limitation on the forklift truck 10. In the forced operation pre-release state S5, the alarm 58 does not issue the alarm.

As illustrated in FIG. 9, when the main controller 31 is in the forced operation pre-release state S5 and a forced operation actual-release condition is satisfied, the main controller 31 is shifted to the normal control state S10. The forced operation actual-release condition being satisfied means that at least one of the following conditions G1 and G2 is satisfied.

Condition G1 . . . The vehicle speed of the forklift truck 10 reaches a value obtained by subtracting a first predetermined value from the target vehicle speed.

Condition G2 . . . The accelerator is OFF.

The condition G1 indicates that a speed deviation as a difference between the target vehicle speed and the vehicle speed of the forklift truck 10 is less than the first predetermined value. Since the acceleration limitation in the forced operation pre-release state S5 deteriorates the speed followability of the forklift truck 10, the forklift truck 10 is less likely to reach the target vehicle speed. The first predetermined value is set in order to determine that the vehicle speed of the forklift truck 10 whose acceleration is limited has reached the target vehicle speed intended by the operator. The first predetermined value may be any value, for example, from 0.5 [km/h] to 2.0 [km/h].

When the main controller 31 is in the forced operation pre-release state S5 and the travel start limitation condition is satisfied, the main controller 31 is shifted to the travel start limitation state S2.

Next, the automatic deceleration control will be described.

The automatic deceleration control includes a travel limitation control that causes the forklift truck 10 to stop and a vehicle speed limitation control that allows the forklift truck 10 to travel at the vehicle speed upper limit or less. The travel limitation control will be firstly described.

Figure 13:
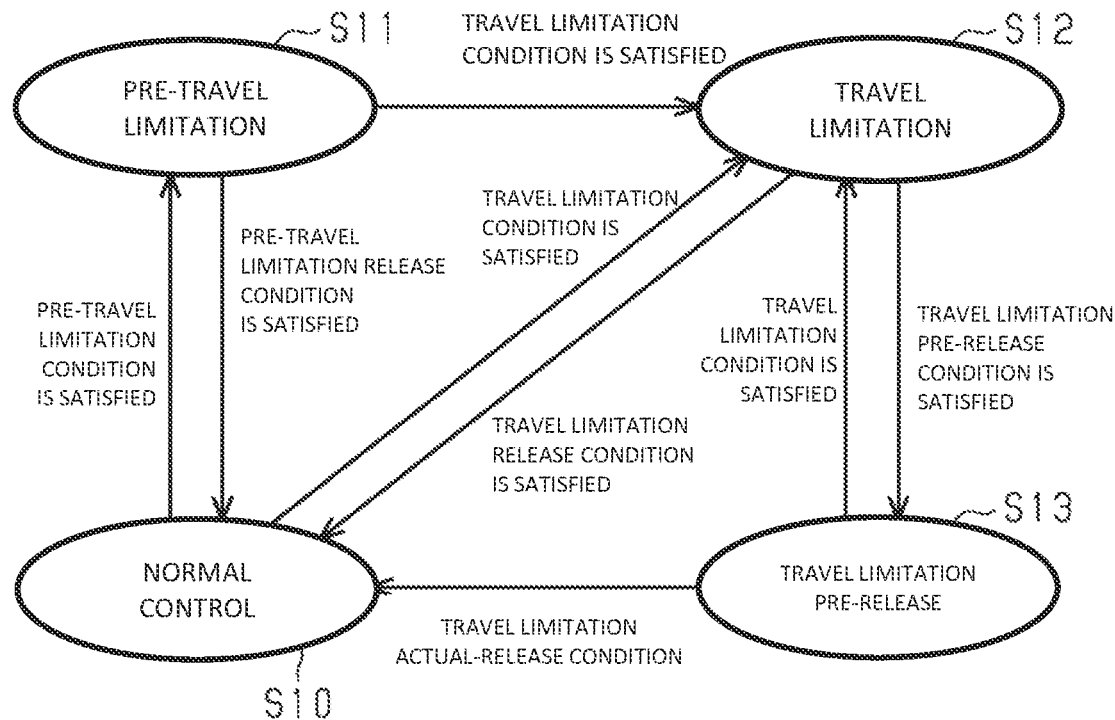
FIG. 13 is a state shifting diagram of a travel limitation control.

As illustrated in FIG. 13, in the travel limitation control, the main controller 31 is set in one of the normal control state S10, a pre-travel limitation state S11, a travel limitation state S12, and a travel limitation pre-release state S13, so that the main controller performs controls depending on the above-described states.

The normal control state S10 is the same as the normal control state S10 in the travel start limitation control.

When the main controller 31 is in the normal control state S10 and the pre-travel limitation condition is satisfied, the main controller 31 is shifted to the pre-travel limitation state S11. The pre-travel limitation condition being satisfied means that both the following conditions H1 and H2 are satisfied.

Condition H1 . . . A person is present in an alarm area.

Condition H2 . . . The forklift truck 10 is traveling in the reverse direction.

The alarm area is different from a part of the automatic deceleration area AA2 in which the speed limit is imposed on the forklift truck 10. The alarm area is set so that the alarm 58 issues an alarm before an entry of the person into the expected trajectory T. The alarm area in the condition H1 may be the entire automatic deceleration area AA2 excluding the expected trajectory T, or may be a predetermined range outwardly extending from the expected trajectory T.

The vehicle speed and the traveling direction calculated by the main controller 31 may determine whether or not the forklift truck 10 is traveling in the reverse direction. When the traveling direction of the forklift truck 10 is oriented in the reverse direction and the vehicle speed is higher than the stop determination threshold, the main controller 31 determines that the forklift truck 10 is traveling in the reverse direction.

The pre-travel limitation state S11 is a state in which the alarm 58 issues the alarm. In the pre-travel limitation state S11, the vehicle speed limitation, the acceleration limitation, and the deceleration limitation are not imposed on the forklift truck 10. The alarm is not issued in the pre-travel limitation state S11 at a time of switchback of the forklift truck 10. The switchback is an operation in which the direction lever 17 is operated so as to switch the traveling direction of the forklift truck 10 from the forward travel to the reverse travel or from the reverse travel to the forward travel. The main controller 31 turns a switchback flag on when the detection result of the direction sensor 35 does not match the traveling direction of the forklift truck 10. The alarm 58 does not issue an alarm even when the main controller 31 is shifted to the pre-travel limitation state S11 with the switchback flag turned on. The switchback flag is released when the main controller 31 is shifted from the pre-travel limitation state S11 to another state, for example.

When the main controller 31 is in the pre-travel limitation state S11 and the pre-travel limitation release condition is satisfied, the main controller 31 is shifted to the normal control state S10. The pre-travel limitation release condition being satisfied means that at least one of the following conditions I1 and I2 is satisfied.

Condition I1 . . . No person is present within the expected trajectory T and the alarm area.

Condition I2 . . . The traveling in the reverse direction is stopped and is not operated.

The stop of the traveling in the reverse direction means that the vehicle speed of the forklift truck 10 is changed from the vehicle speed higher than the stop determination threshold to the stop determination threshold or less. That is, the stop of the traveling in the reverse direction means that the traveling of the forklift truck 10 is stopped. The state in which the traveling in the reverse direction is not operated means that at least one of a state of the accelerator opening degree of 0%, that is, a state in which the accelerator 16 is not operated and a state in which the detection result of the direction sensor 35 indicates any position other than the reverse travel are satisfied. A state in which the detection result of the direction sensor 35 indicates any position other than the reverse travel means that the detection result of the direction sensor 35 indicates the neutral or the forward travel.

When the main controller 31 is in the pre-travel limitation state S11 and the travel limitation condition is satisfied, the main controller 31 is shifted to the travel limitation state S12. The travel limitation condition being satisfied means that all the following conditions J1 and J2 are satisfied.

Condition J1 . . . A person is present within the expected trajectory T.

Condition J2 . . . The forklift truck 10 is traveling in the reverse direction.

Whether or not the condition J1 is satisfied may be determined by the X-coordinate and the Y-coordinate of the person. Since the expected trajectory T is defined by the X-coordinate and the Y-coordinate, the presence or absence of the person within the expected trajectory T can be determined by the X-coordinate and the Y-coordinate of the person. The expected trajectory T is derived within the automatic deceleration area AA2. Thus, when a person is present within the expected trajectory T, it can be said that the person is present within the automatic deceleration area AA2 and the expected trajectory T. The condition J2 is the same as the condition H2.

As illustrated in FIG. 10, the travel limitation state S12 is a state in which the traveling forklift truck 10 is decelerated and stopped by the vehicle speed upper limit being set at zero. In the travel limitation state S12 of the present embodiment, the deceleration is limited. In the travel limitation state S12, a deceleration upper limit is set at DS1 [m/s$^2$]. The DS1 is higher than zero, and lower than the maximum deceleration of the forklift truck 10. The main controller 31 allows the forklift truck 10 to decelerate at the DS1 or less. When the deceleration is limited, the main controller 31 controls the forklift truck 10 so that its deceleration does not exceed the deceleration upper limit. For example, the main controller 31 transmits a command instructing the target rotational speed and a command instructing a target deceleration to the drive controller 43. The drive controller 43 controls the driving motor 41 so that the deceleration of the forklift truck 10 becomes the target deceleration depending on the target rotational speed and the target deceleration. When the deceleration upper limit is set, the main controller 31 transmits the deceleration upper limit as the target deceleration to the drive controller 43. As a result, the main controller 31 imposes the deceleration limitation on the forklift truck 10. In the travel limitation state S12, the alarm 58 issues the alarm. When the operator performs a deceleration operation, the main controller 31 prioritizes the deceleration operation of the operator and does not limit the deceleration. The deceleration operation includes, for example, an operation in which the accelerator is OFF, an operation of the direction lever 17 to the neutral, a brake operation, a switchback operation, and the like.

As illustrated in FIG. 13, when the main controller 31 is in the travel limitation state S12 and the travel limitation release condition is satisfied, the main controller 31 is shifted to the normal control state S10. The travel limitation release condition being satisfied means that the following condition K1 is satisfied.

Condition K1 . . . The traveling in the reverse direction is stopped and not operated.

The condition K1 is the same as the condition I2.

When the main controller 31 is in the travel limitation state S12 and a travel limitation pre-release condition is satisfied, the main controller 31 is shifted to the travel limitation pre-release state S13. The travel limitation pre-release condition being satisfied means that all the following conditions L1 and L2 are satisfied.

Condition L1 . . . No person is present within the expected trajectory T.

Condition L2 . . . The forklift truck 10 is traveling in the reverse direction.

It can be said that the condition L1 is satisfied by failure in satisfying the condition J1. The condition L2 is the same as the condition H2.

As illustrated in FIG. 10, the travel limitation pre-release state S13 is a state in which the speed limit is released while the acceleration is limited. The main controller 31 sets the acceleration upper limit at AS2 [m/s$^2$] and controls the forklift truck 10 so that its acceleration does not exceed the AS2. The AS2 is higher than zero, and lower than the maximum reachable acceleration of the forklift truck 10. The AS2 may be the same as or different from the AS1. In the travel limitation pre-release state S13, the alarm 58 does not issue the alarm.

As illustrated in FIG. 13, the main controller 31 is in the travel limitation pre-release state S13 and a travel limitation actual-release condition is satisfied, the main controller 31 is shifted to the normal control state S10. The travel limitation actual-release condition being satisfied means that at least one of the following conditions M1 and M2 is satisfied.

Condition M1 . . . The vehicle speed of the forklift truck 10 reaches a value obtained by subtracting a second predetermined value from the target vehicle speed.

Condition M2 . . . The reverse travel is not operated.

It can be said that the condition M1 indicates that the speed deviation as the difference between the target vehicle speed and the vehicle speed of the forklift truck 10 is less than the second predetermined value. Since the acceleration limitation in the travel limitation pre-release state S13 deteriorates the speed followability of the forklift truck 10, the vehicle speed of the forklift truck 10 is less likely to reach the target vehicle speed. The second predetermined value is set in order to determine that the vehicle speed of the forklift truck 10 whose acceleration is limited has reached the target vehicle speed intended by the operator. The second predetermined value may be any value, for example, from 0.5 [km/h] to 2.0 [km/h]. The second predetermined value may be the same as or different from the first predetermined value.

When the main controller 31 is in the travel limitation pre-release state S13 and the travel limitation condition is satisfied, the main controller 31 is shifted to the travel limitation state S12. Similarly, when the main controller 31 is in the normal control state S10 and the travel limitation condition is satisfied, the main controller 31 is shifted to the travel limitation state S12.

As described above, the main controller 31 extends the expected trajectory T in the travel direction as the vehicle speed of the forklift truck 10 increases. When the main controller 31 is shifted to the travel limitation state S12 and the expected trajectory T is shortened in the travel direction as the vehicle speed of the forklift truck 10 decreases, the person may be positioned outside the expected trajectory T. In this case, although the forklift truck 10 is approaching the person, the main controller 31 is shifted alternately between the travel limitation state S12 and the travel limitation pre-release state S13. For the purpose of preventing such situation, when the main controller 31 detects the person being present within the expected trajectory T, the main controller 31 keeps the length of the expected trajectory T in the travel direction regardless of the vehicle speed of the forklift truck 10, that is, keeps the trajectory derivation threshold YT. Keeping of the trajectory derivation threshold YT is released when the person disappears within the expected trajectory T, for example.

Figure 14:
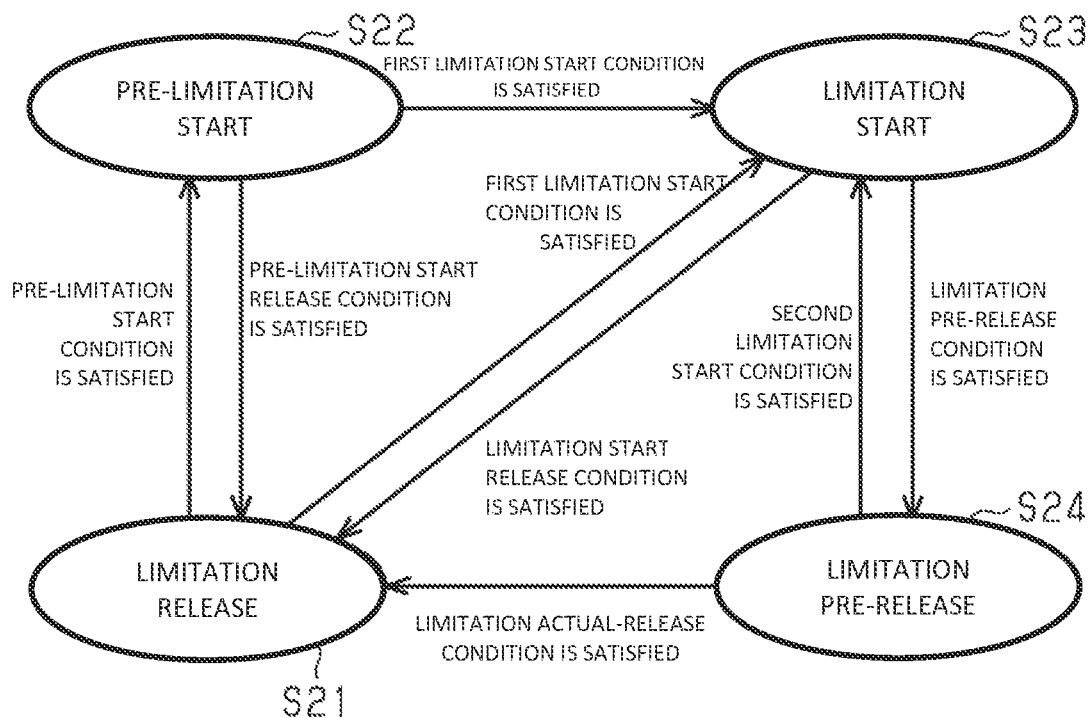
FIG. 14 is a state shifting diagram of a vehicle speed limitation control.

Next, the vehicle speed limitation control will be described. The vehicle speed limitation control includes different controls depending on a case where an object is a person and a case where an object is an obstacle. With reference to FIG. 14, explanation will be given on the vehicle speed limitation control in a case where the object is the person and a case where the object is the obstacle, because of the common state shifting diagram to these cases. Firstly, the vehicle speed limitation control in the case where the object is the person will be described.

As illustrated in FIG. 14, in the vehicle speed limitation control, the main controller 31 is set in one of a limitation release state S21, a pre-limitation start state S22, a limitation start state S23, and a limitation pre-release state S24, so that the main controller 31 performs controls depending on the above-described states.

As illustrated in FIG. 10, the limitation release state S21 is a state in which the speed limit is not imposed on the forklift truck 10. The acceleration and the deceleration are not also limited in the limitation release state S21.

As illustrated in FIG. 14, when the main controller 31 is in the limitation release state S21 and a pre-limitation start condition is satisfied, the main controller 31 is shifted to the pre-limitation start state S22. The pre-limitation start condition being satisfied means that all of the following conditions N1 and N2 are satisfied.

Condition N1 . . . A person is present in a pre-alarm area of the automatic deceleration area AA2.

Condition N2 . . . The forklift truck 10 is traveling in the reverse direction.

The pre-alarm area is farther than a vehicle speed limitation area in which the speed limit is imposed on the forklift truck 10. The vehicle speed limitation area is an area in which the speed limit is imposed on the forklift truck 10, within the automatic deceleration area AA2 excluding the expected trajectory T. The speed limit need not be imposed at a position within the automatic deceleration area AA2, away from the forklift truck 10. That is, the automatic deceleration area AA2 includes both the vehicle speed limitation area in which the speed limit is imposed, and an area in which the speed limit is not imposed, the area being away from the forklift truck 10 farther than the vehicle speed limitation area. The vehicle speed limitation area is an area extending rearward, leftward and rightward, from the expected trajectory T. The vehicle speed limitation area is determined by the vehicle speed of the forklift truck 10 and the expected trajectory T. The pre-alarm area is an area in which the vehicle speed upper limit higher than the vehicle speed of the forklift truck 10 is set. The pre-alarm area is derived from the vehicle speed of the forklift truck 10 and the vehicle speed upper limit that is set depending on a position of the person, so that a time from an entry of the person into the pre-alarm area to an entry of the person into the vehicle speed limitation area becomes a predetermined time. The predetermined time is one second to three seconds, for example.

The pre-limitation start state S22 is a state in which the alarm 58 issues the alarm. The pre-limitation start state S22 is a state for warning the possibility of the vehicle speed limitation to the operator before the vehicle speed is limited. The vehicle speed limitation, the acceleration limitation, and the deceleration limitation are not imposed on the forklift truck 10 in the pre-limitation start state S22. The alarm is not issued in the pre-limitation start state S22 at a time of switchback of the forklift truck 10, as with the pre-travel limitation state S11.

When the main controller 31 is in the pre-limitation start state S22 and a pre-limitation start release condition is satisfied, the main controller 31 is shifted to the limitation release state S21. The pre-limitation start release condition corresponds to at least one of the following conditions O1 and O2 being satisfied.

Condition O1 . . . No person is present in the vehicle speed limitation area and the pre-alarm area.

Condition O2 . . . The traveling in the reverse direction is stopped and not operated.

When the main controller 31 is in the pre-limitation start state S22 and a first limitation start condition is satisfied, the main controller 31 is shifted to the limitation start state S23. The first limitation start condition being satisfied means that all the following conditions P1 and P2 are satisfied.

Condition P1 . . . A person is present in the vehicle speed limitation area of the automatic deceleration area AA2.

Condition P2 . . . The forklift truck 10 is traveling in the reverse direction.

As illustrated in FIG. 10, the limitation start state S23 is a state in which the speed limit is imposed on the forklift truck 10 due to the presence of the person in the vehicle speed limitation area of the automatic deceleration area AA2. The vehicle speed upper limit is lowered as the distance from the forklift truck 10 to the person becomes short. A map in which the distance from the forklift truck 10 to the person is associated with the vehicle speed upper limit is stored in the memory 33 of the main controller 31 or a storage medium such as an external storage device. The main controller 31 sets a map value, which is the vehicle speed upper limit in accordance with the map, as the vehicle speed upper limit. The vehicle speed upper limit need not be lowered as the distance from the forklift truck 10 to the person becomes small. A configuration is simply required to have a correlation in which the vehicle speed upper limit is lower as the distance from the forklift truck 10 to the person becomes small. When a plurality of persons is present in the vehicle speed limitation area of the automatic deceleration area AA2, the vehicle speed upper limit is determined by a position of a person closest to the forklift truck 10.

The deceleration is limited in the limitation start state S23. In the limitation start state S23, the deceleration upper limit is set at DS2 [m/s$^2$]. The DS2 is higher than zero, and lower than the maximum deceleration speed of the forklift truck 10. The DS2 may be the same as or different from the DS1. As with the travel limitation state S12, during the deceleration operation by the operator, the main controller 31 may prioritize such deceleration operation by the operator and need not limit the deceleration.

As illustrated in FIG. 14, when the main controller 31 is in the limitation start state S23 and a limitation start release condition is satisfied, the main controller 31 is shifted to the limitation release state S21. The limitation start release condition being satisfied means that the following Q1 is satisfied. When the main controller 31 is in the limitation release state S21 and the first limitation start condition is satisfied, the main controller 31 is shifted to the limitation start state S23.

Condition Q1 . . . The traveling in the reverse direction is stopped and not operated.

When the main controller 31 is in the limitation start state S23 and a limitation pre-release condition is satisfied, the main controller 31 is shifted to the limitation pre-release state S24. The limitation pre-release condition being satisfied means that the following condition R1 is satisfied.

Condition R1 . . . No person is present in the vehicle speed limitation area of the automatic deceleration area AA2.

As illustrated in FIG. 10, the limitation pre-release state S24 is a state in which the acceleration is limited by the acceleration upper limit being set at AS3 [m/s$^2$] while the vehicle speed limitation is released. The AS3 is higher than zero, and lower than the reachable maximum acceleration of the forklift truck 10. The main controller 31 allows the forklift truck 10 to accelerate at the AS3 or less. The AS3 may be the same as or different from the AS1 or AS2.

As illustrated in FIG. 14, when the main controller 31 is in the limitation pre-release state S24 and a second limitation start condition is satisfied, the main controller 31 is shifted to the limitation start state S23. The second limitation start condition being satisfied means that the following condition S1 is satisfied.

Condition S1 . . . A person is present in the vehicle speed limitation area of the automatic deceleration area AA2.

When the main controller 31 is in the limitation pre-release state S24 and a limitation actual-release condition is satisfied, the main controller 31 is shifted to the limitation release state S21. The limitation actual-release condition being satisfied means that at least one of the following conditions T1 and T2 is satisfied.

Condition T1 . . . The vehicle speed of the forklift truck 10 reaches a value obtained by subtracting a third predetermined value from the target vehicle speed.

Condition T2 . . . The reverse travel is not operated.

The condition T1 indicates that the speed deviation as the difference between the target vehicle speed and the vehicle speed of the forklift truck 10 is less than the third predetermined value. Since the acceleration limitation in the limitation pre-release state S24 deteriorates the speed followability of the forklift truck 10, the forklift truck 10 is less likely to reach the target vehicle speed. The third predetermined value is set in order to determine that the vehicle speed of the forklift truck 10 whose acceleration is limited has reached the target vehicle speed intended by the operator. The third predetermined value may be any value, for example, from 0.5 [km/h] to 2.0 [km/h]. The third predetermined value may be the same as or different from the first predetermined value or the second predetermined value.

As with the travel limitation control, the main controller 31 may keep the trajectory derivation threshold YT when detecting a person being present in the vehicle speed limitation area.

Next, the vehicle speed limitation control when an obstacle as the object is present will be described. Hereinafter, differences from the vehicle speed limitation control when the person as the object is present will be described, and the same description as the vehicle speed control when the person as the object is present will be omitted.

The pre-limitation start condition being satisfied when the obstacle as the object is present means that both the following conditions U1 and U2 are satisfied.

Condition U1 . . . An obstacle is present in the pre-alarm area of the automatic deceleration area AA2.

Condition U2 . . . The forklift truck 10 is traveling in the reverse direction.

The vehicle speed limitation area when the object is the obstacle is an area within the expected trajectory T of the automatic deceleration area AA2. When the object is the obstacle, the vehicle speed limitation area is set within the expected trajectory T, unlike the case where the object is the obstacle. The pre-alarm area is farther than the vehicle speed limitation area. The pre-alarm area is derived from the vehicle speed of the forklift truck 10 and the vehicle speed upper limit that is set depending on a position of the obstacle, so that a time from an entry of the obstacle into the pre-alarm area to an entry of the obstacle into the vehicle speed limitation area becomes a predetermined time. The predetermined time is one second to three seconds, for example. When the object is the obstacle, the pre-alarm area is, for example, one of an area farther than the vehicle speed limitation area within the expected trajectory T, an area excluding the expected trajectory T and being on an extended line of the expected trajectory T, and an area including both these areas.

When the object is an obstacle, the object is changed from the person to the obstacle for each condition of the pre-limitation start release condition, the first limitation start condition, the limitation start release condition, the limitation pre-release condition, the second limitation start condition, and the limitation actual-release condition.

When the object is the obstacle, the vehicle speed upper limit of the forklift truck 10 is lowered as the distance from the forklift truck 10 to the obstacle becomes short. A map in which the distance from the forklift truck 10 to the obstacle is associated with the vehicle speed upper limit is stored in the memory 33 of the main controller 31 or a storage medium such as an external storage device. The main controller 31 sets the vehicle speed upper limit in accordance with the map. The vehicle speed upper limit need not be lowered as the distance from the forklift truck 10 to the obstacle becomes short. A configuration is simply required to have a correlation in which the vehicle speed upper limit is lowered as the distance from the forklift truck 10 to the obstacle becomes short. A value of the vehicle speed upper limit when the obstacle as the object is present is higher than that when the person as the object is present. Specifically, when the distance from the forklift truck 10 to the obstacle is same as the distance from the forklift truck 10 to the person, the vehicle speed upper limit when the obstacle as the object is present is set at a higher value as compared with the vehicle speed upper limit when the person as the object is present.

As described above, the main controller 31 sets the vehicle speed upper limit depending on the states. In the present embodiment, it can be said that the main controller 31 functions as a vehicle speed upper limit setting unit.

Operations of the present embodiment will be described.

When the forklift truck 10 stops and the relationship represented by the table in FIG. 12 is satisfied, the main controller 31 is in the normal control state S10. When no object is present in the travel start limitation area AA1 and the expected trajectory T, the speed limit is not imposed on the forklift truck 10. Since the main controller 31 does not impose the speed limit on the forklift truck 10, the operator of the forklift truck 10 can start driving the forklift truck 10 to travel. When no object is present in the travel start limitation area AA1, the start of traveling of the forklift truck 10 is allowed because of the absence of an object that blocks the traveling of the forklift truck 10. In the forklift truck 10 of the present embodiment, when the forklift truck 10 travels rearward, the object that blocks the traveling of the forklift truck 10 is detected and the driver is urged to avoid such object. Therefore, even in a stop state of the forklift truck 10 and even when an object is present in the travel start limitation area AA1, the operator of the forklift truck 10 can start driving the forklift truck 10 to travel when attempting to start driving the forklift truck 10 to travel.

When the relationship represented by the table in FIG. 11 is satisfied, that is, when the detection result of the direction sensor 35 does not indicate the forward travel in a state where the object is present within the expected trajectory T, the main controller 31 is in the travel start limitation state S2 to prohibit the start of traveling of the forklift truck 10. In the travel start limitation state S2, there is a possibility that the operator attempts to start driving the forklift truck 10 to travel in the reverse direction without recognizing the presence of the object within the expected trajectory T. Thus, the main controller 31 prohibits the start of traveling of the forklift truck 10. When the operator that has recognized the presence of the object within the expected trajectory T changes the steering angle or changes the traveling direction to the forward direction, the object disappears in the expected trajectory T. In this case, the main controller 31 is shifted to the normal control state S10 to allow the start of traveling of the forklift truck 10.

In the travel start limitation state S2, when the operator operates the accelerator 16 and attempts to start driving the forklift truck 10 to travel in the reverse direction, the main controller 31 is shifted to the travel start prohibition state S3. When the main controller 31 is shifted to the travel start prohibition state S3, it is determined that the operator of the forklift truck 10 does not recognize the presence of the object within the expected trajectory T, and the alarm 58 accordingly intensifies the alarm. This alarm notifies the operator of the forklift truck 10 that the object is present in the expected trajectory T.

When the operator's operation of the accelerator 16 is released after the main controller 31 is shifted to the travel start prohibition state S3, it is determined that the operator of the forklift truck 10 recognizes the presence of the object within the expected trajectory T because of the release of the operation of the accelerator 16. Accordingly, the main controller 31 is shifted to the forced operation state S4.

In the forced operation state S4, the start of traveling of the forklift truck 10 is allowed even when the object is present in the travel start limitation area AA1. That is, after it is determined that the operator of the forklift truck 10 recognizes the presence of the object within the travel start limitation area AA1, it is determined that the operator of the forklift truck 10 can start while avoiding the object, which allows the start of traveling of the forklift truck 10.

When the object disappears within the travel start limitation area AA1 by at least one of movements of the forklift truck 10 and the object, the main controller 31 is shifted to the forced operation pre-release state S5. The acceleration is limited in the forced operation pre-release state S5. Since the speed limit is imposed on the forklift truck 10 in the forced operation state S4, the speed deviation may increase. Thus, the forklift truck 10 gradually accelerates by interposing the forced operation pre-release state S5 before the shift from the forced operation state S4 to the normal control state S10. In the forced operation state S4, when the operator operates the direction lever 17 and the detection result of the direction sensor 35 indicates a value different from the previous value, the main controller 31 is shifted to the normal control state S10.

In the forced operation pre-release state S5, when the forklift truck 10 accelerates and the speed deviation decreases, the main controller 31 is shifted to the normal control state S10. Since the acceleration is limited in the forced operation pre-release state S5, the acceleration cannot be efficiently performed. When the efficient acceleration is desired, the accelerator is turned off to release the forced operation pre-release state S5, which improves operability. When the travel start limitation condition is satisfied again before the shift of the forced operation pre-release state S5 to the normal control state S10, the main controller 31 is shifted to the travel start limitation state S2.

As described above, the travel start limitation control works when the forklift truck 10 starts from the stop state. In the travel start limitation control, when the forklift truck 10 stops and the object is present within the travel start limitation area AA1 and the expected trajectory T, the start of traveling of the forklift truck 10 is limited by the vehicle speed upper limit being set at zero. The speed limit is imposed on the forklift truck 10 when the forklift truck 10 is traveling in a direction approaching the object, which prevents the forklift truck 10 from approaching the object.

When a person enters the pre-alarm area during the traveling of the forklift truck 10, the main controller 31 is shifted to the pre-limitation start state S22. The main controller 31 causes the alarm 58 to issue an alarm and thus causes the operator to recognize that the person may enter the expected trajectory T. When the operator operates the forklift truck 10 so that the forklift truck 10 turns in a direction away from the person or the forklift truck 10 stops and does not travel rearward, the main controller 31 is shifted to the limitation release state S21. When the person enters the vehicle speed limitation area with the main controller 31 shifted to the pre-limitation start state S22, the main controller 31 is shifted to the limitation start state S23. The main controller 31 sets the vehicle speed upper limit at a value in accordance with the map. At this time, the deceleration upper limit DS2 is set, so that the deceleration is also limited. Thus, the forklift truck 10 gradually decelerates.

In the limitation start state S23, although the vehicle speed upper limit is set, the traveling of the forklift truck 10 is allowed at the vehicle speed upper limit or less. The operator can cause the forklift truck 10 to travel while avoiding the person. When the main controller 31 is in the limitation start state S23 and the limitation start release condition is satisfied, the main controller 31 is shifted to the limitation release state S21, which releases the vehicle speed limitation.

In the limitation start state S23, when the operator continues to operate the traveling of the forklift truck 10 and the person disappears in the vehicle speed limitation area, the main controller 31 is shifted to the limitation pre-release state S24. Accordingly, the vehicle speed limitation is released. The acceleration is limited in the limitation pre-release state S24. Since the speed limit is imposed on the forklift truck 10 in the limitation start state S23, the speed deviation may increase. Thus, the forklift truck 10 gradually accelerates by interposing the limitation pre-release state S24 before the shift from the limitation start state S23 to the limitation release state S21.

In the limitation pre-release state S24, when the forklift truck 10 accelerates and the speed deviation decreases, the main controller 31 is shifted to the limitation release state S21. Since the acceleration is limited in the limitation pre-release state S24, the acceleration is not efficiently performed. When the efficient acceleration is desired, the accelerator is turned off to release the limitation pre-release state S24, which improves operability. When the operator changes the traveling direction to the forward direction in the limitation pre-release state S24, the main controller 31 is shifted to the limitation release state S21. When the person enters the vehicle speed limitation area again before the main controller 31 is shifted from the limitation pre-release state S24 to the limitation release state S21, the main controller 31 is shifted to the limitation start state S23.

When a person enters the alarm area during the traveling of the forklift truck 10, the main controller 31 is shifted to the pre-travel limitation state S11. The main controller 31 causes the alarm 58 to issue an alarm, thereby causing the operator to recognize that the person may enter the expected trajectory T. When the operator operates the forklift truck 10 so that the forklift truck 10 turns in a direction away from the person or the forklift truck 10 stops and does not travel rearward, the main controller 31 is shifted to the normal control state S10. When the person enters the expected trajectory T with the main controller 31 shifted to the pre-travel limitation state S11, the main controller 31 is shifted to the travel limitation state S12. The main controller 31 sets the vehicle speed upper limit at zero, which stops the forklift truck 10. At this time, the deceleration upper limit DS1 is set, so that the deceleration is also limited. Thus, the forklift truck 10 gradually stops.

When the forklift truck 10 stops and the reverse traveling is not operated by the operator after the shift of the main controller 31 to the travel limitation state S12, the main controller 31 is shifted to the normal control state S10. When the main controller 31 is in the normal control state S10 and the travel limitation condition is satisfied, the main controller 31 is shifted to the travel limitation state S12 without interposing the pre-travel limitation state S11. A state in which the travel limitation condition is satisfied without satisfying the pre-travel limitation condition is assumed to be, for example, a state in which the vehicle speed of the forklift truck 10 is high or a state in which the object enters the expected trajectory T from a blind spot of the object detectable range of the object detector 51.

In the travel limitation state S12 of the main controller 31, when the person disappears in the expected trajectory T before the stop of the forklift truck 10, the main controller 31 is shifted to the travel limitation pre-release state S13. When the person enters the expected trajectory T again after the shift to the travel limitation pre-release state S13, the main controller 31 is shifted to the travel limitation state S12. The acceleration is limited in the travel limitation pre-release state S13. Since the speed limit is imposed on the forklift truck 10 in the travel limitation state S12, the speed deviation may increase. Thus, the forklift truck 10 gradually accelerates by interposing the travel limitation pre-release state S13 before the shift from the travel limitation state S12 to the normal control state S10.

In the travel limitation pre-release state S13, when the forklift truck 10 accelerates and the speed deviation decreases, the main controller 31 is shifted to the normal control state S10. Since the acceleration is limited in the travel limitation pre-release state S13, the acceleration cannot be efficiently performed. When the efficient acceleration is desired, the accelerator is turned off to release the travel limitation pre-release state S13, which improves operability.

As described above, when a person is detected by the object detector 51 with the forklift truck 10 traveling, the forklift truck 10 is decelerated by working the vehicle speed limitation control on the person within the automatic deceleration area AA2 and outside the expected trajectory T. Furthermore, when the person enters the expected trajectory T, the travel limitation control works, which stops the forklift truck 10. It can be said that the speed limit is imposed on the forklift truck 10 when the forklift truck 10 is traveling in a direction approaching the person.

When the obstacle enters the pre-alarm area during the traveling of the forklift truck 10, the main controller 31 is shifted to the pre-limitation start state S22. The main controller 31 causes the alarm 58 to issue an alarm and thus causes the operator to recognize that the obstacle is present nearby. When the operator operates the forklift truck 10 so that the forklift truck 10 turns in a direction away from the obstacle or the forklift truck 10 stops and does not travel rearward, the main controller 31 is shifted to the limitation release state S21. When the obstacle enters the vehicle speed limitation area with the main controller 31 shifted to the pre-limitation start state S22, the main controller 31 is shifted to the limitation start state S23. The main controller 31 sets the vehicle speed upper limit at a value in accordance with the map. At this time, the deceleration upper limit DS2 is set, so that the deceleration is also limited. Thus, the forklift truck 10 gradually decelerates.

In the limitation start state S23, although the vehicle speed upper limit is set, the traveling of the forklift truck 10 is allowed at the vehicle speed upper limit or less. The operator can cause the forklift truck 10 to travel while avoiding the obstacle. When the main controller 31 is in the limitation start state S23 and the limitation start release condition is satisfied, the main controller 31 is shifted to the limitation release state S21, which releases the vehicle speed limitation. When the object is the obstacle, the vehicle speed limitation area is set within the expected trajectory T, so that the limitation start release condition can be satisfied more easily than a case of the person as the object. In the limitation pre-release state S24, the same operation as a case of the person as the object can be obtained.

As described above, when the obstacle is detected by the object detector 51 with the forklift truck 10 traveling, the vehicle speed limitation control works on the obstacle. Accordingly, the speed limit is imposed on the forklift truck 10 when the obstacle enters the automatic deceleration area AA2 and the expected trajectory T. On the other hand, the speed limit is not imposed on the forklift truck 10 when the obstacle is present outside the expected trajectory T.

In the automatic deceleration control, when the person is present in the expected trajectory T, the vehicle speed upper limit is set at zero. On the other hand, when the obstacle is present in the expected trajectory T, the vehicle speed upper limit is set at a value higher than zero. When the person is present outside the expected trajectory T, the vehicle speed upper limit is set at a value higher than zero. On the other hand, when the obstacle is present outside the expected trajectory T, the speed limit is not imposed on the forklift truck 10. Therefore, when the object is determined as the person, the main controller 31 sets the vehicle speed upper limit at a lower value as compared with the vehicle speed upper limit when the object is determined as the obstacle. When the object is present in the automatic deceleration area AA2 and the expected trajectory T, the main controller 31 sets the vehicle speed upper limit at a lower value as compared with the case in which the object is present within the automatic deceleration area AA2 and outside the expected trajectory T. "Setting of the vehicle speed upper limit at a lower value" includes a setting from a state without a setting of the vehicle speed upper limit. The speed limit need not be imposed on the forklift truck 10 even when the object is present within or outside the expected trajectory T. As in the present embodiment, the speed limit need not be imposed on the forklift truck 10 when the object is present outside the expected trajectory T.

In the present embodiment, state shifts in the travel start limitation control, the travel limitation control, the vehicle speed limitation control for a person, and the vehicle speed limitation control for an obstacle are performed in parallel. Thus, various vehicle speed upper limits and alarm modes may be set for each state shift. In this case, a control corresponding to one of the states only need be performed based on a preset priority. For example, the main controller 31 performs a predetermined control at the lowest vehicle speed upper limit.

Effects of the present embodiment will be described.

(1) The main controller 31 sets the vehicle speed upper limit when an object is present within the expected trajectory T. Specifically, in each of the travel start limitation control, the travel limitation control, the vehicle speed limitation control for the person, and the vehicle speed limitation control for the obstacle, the vehicle speed upper limit is set when the object is present within the expected trajectory T. The main controller 31 controls the forklift truck 10 so as not to exceed the vehicle speed upper limit. The vehicle speed of the forklift truck 10 is set at the vehicle speed upper limit or less even when the operator of the forklift truck 10 does not perform the deceleration operation. Therefore, operability of the operator of the forklift truck 10 can be improved.

(2) When an object is present within the automatic deceleration area AA2 and the expected trajectory T, the main controller 31 sets the vehicle speed upper limit at a lower value as compared with the vehicle speed upper limit when the object is present within the automatic deceleration area AA2 and outside the expected trajectory T. In the present embodiment, the vehicle speed upper limit is set at zero when a person as the object is present in the expected trajectory T. On the other hand, the vehicle speed upper limit is set at a value higher than zero when the person is present outside the expected trajectory T. The vehicle speed upper limit is set at a value higher than zero when an obstacle as the object is present within the expected trajectory T. On the other hand, the vehicle speed upper limit is not set when the obstacle is present outside the expected trajectory T.

Operability may be reduced when the vehicle speed upper limit in a case in which the object is present within the expected trajectory T is always set. For example, when the person is present within the automatic deceleration area AA2 regardless of the expected trajectory T and the main controller 31 sets the vehicle speed upper limit at zero, the forklift truck 10 stops even when the person is at a position that does not block the traveling of the forklift truck 10. In this case, the forklift truck 10 stops frequently, resulting in reduction of operability. Operability may be also reduced even when the object is the obstacle. The forklift truck 10 is often used in an environment where a plurality of objects is present around the forklift truck 10. In addition, frequency of a sharp turning of the forklift truck 10 is higher than that of passenger cars, and the forklift truck 10 is often equipped with a stereo camera having a field of view wider than a stereo camera mounted on the passenger cars. Therefore, in the forklift truck 10, operability is significantly reduced when the vehicle speed upper limit in a case in which the object is present within the expected trajectory T is always set.

In contrast, in the forklift truck 10 of the present embodiment, a vehicle speed upper limit higher than that when the object is present within the expected trajectory T is allowed when the object is not present within the expected trajectory T regardless of the presence of the object within the automatic deceleration area AA2. The object being present within the expected trajectory T is more likely to block the traveling of the forklift truck 10 as compared with the object being present outside the expected trajectory T. Therefore, the vehicle speed limitation is relaxed when no object is present in the expected trajectory T, which improves operability.

(3) When an object detected by the object detector 51 is an obstacle, the vehicle speed upper limit is set at a higher value as compared with the vehicle speed upper limit when the person as the object is present. The forklift truck 10 is often used in an environment where a plurality of objects is present around the forklift truck 10. Therefore, when the object is the obstacle, an allowable vehicle speed of the forklift truck 10 increases, which further improves operability. In particular, the speed limit is not imposed on the forklift truck 10 when the obstacle as the object is not present within the expected trajectory T, which can further improve operability.

(4) The obstacle detector 55 can determine whether an object is a person or an obstacle. When the main controller 31 performs the automatic deceleration control, the main controller 31 sets the vehicle speed upper limit at a lower value when the person as the object is present, as compared with the vehicle speed upper limit when the obstacle as the object is present. In the present embodiment, the vehicle speed upper limit is set at zero when the person is present within the expected trajectory T. On the other hand, the vehicle speed upper limit is set at a value higher than zero when the obstacle is present within the expected trajectory T. Similarly, the vehicle speed upper limit when the person is present outside the expected trajectory T is set at a lower value as compared with the vehicle speed upper limit when the obstacle is present outside the expected trajectory T. The person is more likely to move as compared with the obstacle, and may approach the forklift truck 10. Thus, the vehicle speed upper limit when the object is the person is set at a lower value as compared with the vehicle speed upper limit when the object is the obstacle, which prompts the operator of the forklift truck 10 to avoid the object.

(5) When a person as the object is present outside the expected trajectory T, the main controller 31 sets the vehicle speed upper limit at a value higher than zero. When the person as the object is present within the expected trajectory T, the main controller 31 sets the vehicle speed upper limit at zero. When the person as the object is present outside the expected trajectory T, the main controller 31 lowers a value of the vehicle speed upper limit as the distance from the forklift truck 10 to the person becomes short. The vehicle speed of the forklift truck 10 is lowered as the person approaches the forklift truck 10. Thus, the forklift truck 10 can gradually stop when the vehicle speed upper limit is set at zero after entry of the person into the expected trajectory T.

(6) When an object is present within the travel start limitation area AA1 and within the expected trajectory T, the main controller 31 sets the vehicle speed upper limit at zero. The vehicle speed upper limit is set at zero, so that the start of traveling of the forklift truck 10 is prohibited. When the object is present within the travel start limitation area AA1 and within the expected trajectory T, the traveling of the forklift truck 10 may be blocked. In this case, the start of traveling of the forklift truck 10 is prohibited, which prompts the operator to change the traveling direction and to operate turning of the forklift truck 10. This prevents blocking of the start of traveling of the forklift truck 10 and further improves operability.

(7) The main controller 31 extends the expected trajectory T in the traveling direction as the vehicle speed of the forklift truck 10 increases. A time to reach the object becomes short as the vehicle speed of the forklift truck 10 increases. Thus, the expected trajectory T is extended as the vehicle speed of the forklift truck 10 increases, which can appropriately limit the vehicle speed depending on the vehicle speed of the forklift truck 10.

(8) The main controller 31 derives the expected trajectory T from the steering angle. When the forklift truck 10 turns, the main controller 31 derives the expected trajectory T in line with the turning direction of the forklift truck 10. Therefore, accuracy of the derived expected trajectory T can be improved.

(9) The forklift truck 10 includes the cargo handling apparatus 20 on which a cargo is loaded. For loading the cargo, stability is required for the forklift truck 10 on which the cargo is loaded. The stability of the forklift truck 10 can be improved by the vehicle speed upper limit being set.

(10) The forced operation state S4 is set for the travel start limitation control. When the main controller 31 is shifted to the forced operation state S4, the main controller 31 allows the start of traveling of the forklift truck 10 even when an object is present within the travel start limitation area AA1 and the expected trajectory T. If the object is present in the travel start limitation area AA1 and the expected trajectory T and the start of traveling of the forklift truck 10 is always prohibited, the start of traveling of the forklift truck 10 is prohibited even in a state of the forklift truck 10 capable of starting while avoiding the object. In the forced operation state S4, the vehicle speed upper limit is set and the forklift truck 10 is allowed to start at a low vehicle speed, which can further improve operability.

(11) In the travel start limitation control, the alarm 58 issues an alarm when an object is present within the expected trajectory T, and the alarm 58 does not issue the alarm when the object is present outside the expected trajectory T. In the travel limitation control, the alarm 58 issues an alarm when a person is present within the warning area, and the alarm 58 does not issue the alarm when the person is present farther than the warning area. In the vehicle speed limitation control for a person and the vehicle speed limitation control for an obstacle, the alarm 58 issues an alarm when the object is present in the pre-alarm area, and the alarm 58 does not issue the alarm when the object is present farther than the pre-alarm area. As such, it can be said that the main controller 31 limits an area where the alarm 58 issues the alarm, within the object detectable range of the object detector 51. When the alarm 58 always issues an alarm upon detection of the object by the object detector 51, the alarm is issued regardless of the object that does not block the traveling of the forklift truck 10. In this case, the operator frequently receives the alarm and cannot recognize the object even when the object actually blocks the traveling of the forklift truck 10. Limitation of the alarm by the alarm 58 can prevent the operator from frequently receiving the alarm.

The embodiment can be modified and implemented as follows. The embodiment and the following modified embodiments can be implemented in combination with each other to the extent that there is no technical contradiction.

The vehicle speed upper limit that is set in the forced operation state S4 may be lowered as the lifting height of the cargo handling apparatus 20 increases. In this case, it is unnecessary to lower the vehicle speed upper limit as the lifting height of the cargo handling apparatus 20 increases. When the mast 21 is lifted from the lowest position to the highest position, it is simply required to have at least one point at which the vehicle speed upper limit is lowered and have no point exceeding this vehicle speed upper limit. For example, the lifting height that is lower than a preset threshold of the lifting height is defined as a low lifting height, and the lifting height that is higher than the preset threshold of the lifting height is defined as a high lifting height. In a case of the high lifting height, the main controller 31 sets the vehicle speed upper limit at a lower value as compared with the vehicle speed upper limit in a case of the low lifting height.

Similarly, the vehicle speed upper limit that is set in the limitation start state S23 may be lowered as the lifting height of the cargo handling apparatus 20 increases. The vehicle speed upper limit that is set in the limitation start state S23 is set depending on the distance to the object and the lifting height. The value of the vehicle speed upper limit is lowered as the distance to the object becomes short. The value of the vehicle speed upper limit is lowered as the lifting height of the cargo handling apparatus 20 increases. For the vehicle speed upper limit when the person is present outside the expected trajectory T and within the automatic deceleration area AA2 and the vehicle speed upper limit when the obstacle is present within the expected trajectory T, one of these vehicle speed upper limits may be lowered as the lifting height of the cargo handling apparatus 20 increases, or both the vehicle speed upper limits may be lowered as the lifting height of the cargo handling apparatus 20 increases. The vehicle speed upper limit that is set in the limitation start state S23 may be a value changing depending on only the lifting height of the cargo handling apparatus 20 without changing depending on the distance to the object.

The vehicle speed upper limit that is set in the forced operation state S4 may be lowered as the weight of the cargo loaded on the cargo handling apparatus 20 increases. In this case, it is unnecessary to lower the vehicle speed upper limit in proportion to the heavier weight of the cargo. When the weight of the cargo is changed from the weight without the cargo to the maximum weight of the cargo, it is simply required to have at least one point at which the vehicle speed upper limit is lowered and have no point exceeding the vehicle speed upper limit. For example, the weight of the cargo that is smaller than a preset threshold of the weight is defined as a light weight, and the weight of the cargo that is larger than the preset threshold of the weight of the cargo is defined as a heavy weight. In a case of the heavy weight, the main controller 31 sets the vehicle speed upper limit at a lower value as compared with the vehicle speed upper limit in a case of the light weight.

Similarly, the vehicle speed upper limit that is set in the limitation start state S23 may be lowered as the weight of the cargo increases. The vehicle speed upper limit that is set in the limitation start state S23 is set depending on the distance to the object and the weight of the cargo. The value of the vehicle speed upper limit is lowered as the distance to the object becomes short. The value of the vehicle speed upper limit is lowered as the weight of the cargo increases. For the vehicle speed upper limit when the person is present outside the expected trajectory T and within the automatic deceleration area AA2 and the vehicle speed upper limit when the obstacle is present within the expected trajectory T, one of these vehicle speed upper limits may be lowered as the weight of the cargo increases, or both the vehicle speed upper limits may be lowered as the weight of the cargo increases. The vehicle speed upper limit that is set in the limitation start state S23 may be a value changing depending on only the weight of the cargo without changing depending on the distance to the object.

At least one of the vehicle speed upper limit that is set in the forced operation state S4 and the vehicle speed upper limit that is set in the limitation start state S23 may be lowered as the lifting height of the cargo handling apparatus 20 increases and as the weight of the cargo increases. That is, the above-described two modified embodiments described for the vehicle speed upper limit may be combined with each other.

The acceleration upper limit that is set in at least one of the forced operation pre-release state S5, the limitation pre-release state S24 when the person is present outside the expected trajectory T, and the limitation pre-release state S24 when the obstacle is present outside the expected trajectory T may be lowered as the lifting height of the cargo handling apparatus 20 increases. In this case, the forklift truck 10 gradually accelerates as the lifting height of the cargo handling apparatus 20 increases.

The acceleration upper limit that is set in at least one of the forced operation pre-release state S5, the limitation pre-release state S24 when the person is present outside the expected trajectory T, and the limitation pre-release state S24 when the obstacle is present outside the expected trajectory T may be lowered as the weight of the cargo increases. In this case, the forklift truck 10 gradually accelerates as the weight of the cargo increases.

The acceleration upper limit that is set in at least one of the forced operation pre-release state S5, the limitation pre-release state S24 when the person is present outside the expected trajectory T, and the limitation pre-release state S24 when the obstacle is present outside the expected trajectory T may be lowered as the lifting height of the cargo handling apparatus 20 increases and as the weight of the cargo increases. That is, the above-described two modified embodiments described for the acceleration upper limit may be combined with each other.

The deceleration upper limit that is set in at least one of the travel limitation state S12, the limitation start state S23 when the person is present outside the expected trajectory T, and the limitation start state S23 when the obstacle is present within the expected trajectory T may be lowered as the lifting height of the cargo handling apparatus 20 increases. In this case, the forklift truck 10 gradually decelerates as the lifting height of the cargo handling apparatus 20 increases.

The deceleration upper limit that is set in at least one of the travel limitation state S12, the limitation start state S23 when the person is present outside the expected trajectory T, and the limitation start state S23 when the obstacle is present inside the expected trajectory T may be lowered as the weight of the cargo increases. In this case, the forklift truck 10 gradually decelerates as the weight of the cargo increases.

The deceleration upper limit that is set in at least one of the travel limitation state S12, the limitation start state S23 when the person is present outside the expected trajectory T, and the limitation start state S23 when the obstacle is present inside the expected trajectory T may be lowered as the lifting height of the cargo handling apparatus 20 increases and as the weight of the cargo increases. That is, the above-described two modified embodiments described for the deceleration upper limit may be combined with each other.

The forklift truck 10 need not have the lifting height sensor 37 when none of the vehicle speed upper limit, the acceleration upper limit, and the deceleration upper limit is changed depending on the lifting height of the cargo handling apparatus 20.

The forklift truck 10 need not have the weight sensor 38 when none of the vehicle speed upper limit, the acceleration upper limit, and the deceleration upper limit is changed depending on the weight of the cargo.

The vehicle speed upper limit that is set in the limitation start state S23 need not be changed depending on the distance to the object. That is, the vehicle speed upper limit that is set in the limitation start state S23 may be a fixed value. In this case, the vehicle speed upper limit when the person is present outside the expected trajectory T and within the automatic deceleration area AA2 is preferably set at a lower value than that when the obstacle is present within the expected trajectory T.

The main controller 31 need not extend the expected trajectory T in the traveling direction as the vehicle speed of the forklift truck 10 increases. In this case, the expected trajectory T in the traveling direction has a predetermined fixed length.

The main controller 31 need not change the expected trajectory T depending on the steering angle of the steering wheels 14. That is, the expected trajectory T may correspond to that when the forklift truck 10 is traveling straight in the reverse direction regardless of turning of the forklift truck 10.

The main controller 31 may define an area between the trajectory LT on which the left end LE of the vehicle body 11 passes and the trajectory RT on which the right end RE of the vehicle body 11 passes, and an area that is positioned outside the aforementioned area and extends along the trajectory LT and the trajectory RT, as the expected trajectory T. That is, the expected trajectory T may be an area adding a margin extending in the vehicle width direction of the forklift truck 10 to an area on which the forklift truck 10 is expected to pass.

The main controller 31 may derive the expected trajectory T depending on the steering angle when deriving the expected trajectory T of the forklift truck 10. For example, a threshold capable of determining the turning to the right and a threshold capable of determining the turning to the left are set in the steering angle, and the steering angle is used to determine whether the forklift truck 10 travels straight, turns to the right, or turns to the left. In the travel start limitation control, the main controller 31 determines, by using the steering angle, which areas N, NL, or NR the forklift truck 10 passes. In this case, each of the areas N, NL, and NR can be considered as an expected trajectory.

The main controller 31 may derive the expected trajectory T from the map in which the vehicle speed of the forklift truck 10 and the steering angle are associated with the X-coordinate and the Y-coordinate.

The main controller 31 performs the travel start limitation control and need not perform the automatic deceleration control. In this case, the travel start limitation area AA1 is set within the object detectable range of the object detector 51, but the automatic deceleration area AA2 is not set. The obstacle detector 55 need not determine whether the object is a person or not.

The main controller 31 performs the automatic deceleration control and need not perform the travel start limitation control. In this case, the automatic deceleration area AA2 is set within the object detectable range of the object detector 51, but the travel start limitation area AA1 is not set.

The main controller 31 need not perform different control depending on whether the object is a person or an obstacle. Specifically, in the automatic deceleration control, the main controller 31 stops the traveling of the forklift truck 10 when the object is present within the expected trajectory T. The main controller 31 need not limit the vehicle speed when no object is present within the expected trajectory T. In the automatic deceleration control, the main controller 31 may set the vehicle speed upper limit at a lower value when the object is present within the expected trajectory T as compared with vehicle speed upper limit when the object is present outside the expected trajectory T. In this case, the obstacle detector 55 need not determine whether the object is a person or not.

The travel start limitation control is simply required to shift a state of the main controller 31 to at least two states, the normal control state S10 and the travel start limitation state S2. In this case, when the travel start limitation condition is satisfied, the main controller 31 is shifted to the travel start limitation state S2. When the travel start limitation release condition is satisfied, the main controller 31 is shifted to the normal control state S10. That is, when the object is present within the expected trajectory T, the main controller 31 is simply required to prohibit the forklift truck 10 from starting to travel in the direction approaching the object.

The travel limitation control is simply required to shift the state of the main controller 31 to at least two states, the normal control state S10 and the travel limitation state S12. In this case, when the travel limitation condition is satisfied, the main controller 31 is shifted to the travel limitation state S12. When the travel limitation release condition is satisfied, the main controller 31 is shifted to the normal control state S10. That is, when the person is present within the expected trajectory T, the main controller 31 is simply required to set the vehicle speed upper limit at zero.

The vehicle speed limit control is simply required to shift the state of the main controller 31 to at least two states, the limitation release state S21 and the limitation start state S23. In this case, when the first limitation start condition is satisfied, the main controller 31 is shifted to the limitation start state S23. When the limitation start release condition is satisfied, the main controller 31 is shifted to the limitation release state S21. That is, when the object is present within the vehicle speed limitation area, the main controller 31 is simply required to set the vehicle speed upper limit.

The forced operation pre-release state S5 of the travel start limitation control may be omitted. In this case, when the main controller 31 is in the forced operation state S4 and the condition F1 is satisfied, the main controller 31 is shifted to the normal control state S10.

The main controller 31 is simply required to set at least the vehicle speed upper limit, and need not set the acceleration upper limit and the deceleration upper limit in each of the automatic deceleration control and the travel start limitation control.

The automatic deceleration area AA2 may be an area narrower than the object detectable range of the object detector 51.

The acceleration upper limit and the deceleration upper limit may be set in each state in which the acceleration upper limit and the deceleration upper limit are not set.

In the shift of the states in the travel start limitation control, each condition may be changed as follows.

The travel start limitation condition being satisfied may mean that all of the following conditions A11, A12, and A13 are satisfied.

Condition A11 . . . An object is present within the travel start limitation area AA1 and the expected trajectory T.

Condition A12 . . . The forklift truck 10 stops.

Condition A13 . . . The detection result of the direction sensor 35 does not indicate the forward travel.

Whether or not the condition A11 is satisfied can be determined from the X-coordinate and the Y-coordinate of the object. Since the travel start limitation area AA1 and the expected trajectory T are defined by the X-coordinate and the Y-coordinate, the presence of an object within the travel start limitation area AA1 and the expected trajectory T can be determined from the X-coordinate and the Y-coordinate of the object. The condition A12 is the same condition as the condition A3. The condition A13 indicates the reverse travel or the neutral as the detection result of the direction sensor 35.

The travel start limitation release condition may satisfy at least one of the following conditions B11 and B12.

Condition B11 . . . No object is present within the travel start limitation area AA1 and the expected trajectory T.

Condition B12 . . . The detection result of the direction sensor 35 indicates the forward travel.

It can be said that the condition B11 indicates the failure in satisfying the condition A11. It can be said that the condition B12 indicates the failure in satisfying the condition A13.

When the travel start limitation condition and the travel start limitation release condition are set as described above, it is unnecessary to divide the travel start limitation area AA1 into the areas N, NL, and NR.

The forced operation pre-release condition being satisfied may correspond to the condition B11 being satisfied.

The forced operation actual-release condition being satisfied may correspond to any of the conditions G1 and G2 of the embodiment and the following condition G11 being satisfied.

Condition G11 ... The detection result of the direction sensor 35 indicates the forward travel.

The condition G11 is added to the forced operation actual-release condition, which shifts the state of the main controller 31 to the normal control state S10 when the operator changes the traveling direction to the forward direction during the forced operation pre-release state S5. The operator can intentionally shift the main controller 31 to the normal control state S10 by changing the traveling direction to the forward direction.

The forced operation actual-release condition being satisfied may correspond to one of the conditions G1, G2, and G11 and the following condition G12 being satisfied.

Condition G12 ... Both the following conditions G21 and the condition G22 are satisfied.

Condition G21 ... A state in which the detection result of the direction sensor 35 indicates the reverse direction and the areas N, NL, and NR where the object is present does not match the extending direction of the expected trajectory T has been continued for a specified time.

Condition G22 ... The forklift truck 10 is traveling.

When the condition G21 is satisfied, it is considered that the operator of the forklift truck 10 operates the steering wheel and changes the turning direction to a direction where no object is present. That is, it is considered that the operator of the forklift truck 10 recognizes the presence of an object by receiving one of the vehicle speed limitation, the acceleration limitation, and the alarm, and performs an avoidance operation for avoiding the object. The specified time in the condition G21 may be set at any value. The specified time is set for a time required for determining that the operator of the forklift truck 10 is performing the avoidance operation. Even when the steering wheel operation changes the turning direction to the direction where no object is present, when the turning direction is returned to the direction where the object is present before the lapse of the specified time, it is determined that the avoidance operation is not performed. The specified time can be arbitrarily set within a range of one second to three seconds, for example.

The condition G22 is the same condition as the condition E3. When the vehicle speed is higher than the stop determination threshold [km/h], the main controller 31 determines that the forklift truck 10 is traveling.

The condition G21 is defined as one of conditions for satisfying the condition G12, which shifts from the forced operation pre-release state S5 to the normal control state S10 when the operator performs the avoidance operation for avoiding the object. When the main controller 31 is in the forced operation pre-release state S5, the operator may recognize an object that blocks the traveling of the forklift truck 10, and perform the avoidance operation for avoiding the object. In this case, the acceleration of the forklift truck 10 is limited by the acceleration limitation, so that the forklift truck 10 cannot travel smoothly, which may reduce operability. When the condition G12 is satisfied, the acceleration limitation can be released by the shift of the main controller 31 to the normal control state S10. This can relax the acceleration limitation of the forklift truck 10 that is traveling during or after the avoidance operation, and prevent reduction of operability.

The condition G22 is defined as one of conditions for satisfying the condition G12, which prevents the main controller 31 from being shifted to the travel start limitation state S2 immediately after the shift of the main controller 31 to the normal control state S10 due to the condition G12 being satisfied. When only the condition G21 is defined as a condition for satisfying the condition G12, the condition G12 can be satisfied even in a stop state of the forklift truck 10. In this case, the state of the main controller 31 may be shifted to the travel start limitation state S2 immediately after the shift of the main controller 31 to the normal control state S10 due to the condition G12 being satisfied. For example, even though the forklift truck 10 stops and changes its turning direction to a direction where no object is present, when the turning direction is returned to the direction where an object is present, the main controller 31 may be shifted to the travel start limitation state S2. In this case, even though the operator is to perform the avoidance operation, this operation may be blocked by the shift to the travel start limitation state S2. The condition G22 is defined as one of conditions for satisfying the condition G12, which satisfies the condition G12 when the forklift truck 10 is traveling. When the main controller 31 is shifted to the normal control state S10 due to the condition G12 being satisfied, there is difficulty in satisfying the travel start limitation condition due to prevention of the condition A3 from being satisfied. This can prevent the avoidance operation from being blocked.

The forced operation actual-release condition being satisfied may correspond to one of the conditions G1, G2, G11, and G21 being satisfied. Even in this case, when the operator is performing the avoidance operation, the forced operation pre-release state S5 is shifted to the normal control state S10 due to the condition G21, which can prevent reduction of operability. Even when the condition G22 is not satisfied, the main controller 31 is shifted to the normal control state S10 due to the condition G21 being satisfied, so that the state of the main controller 31 is shifted to the travel start limitation state S2 immediately after the shift to the normal control state S10. The condition A1 and the condition A2 may be satisfied when the main controller 31 is shifted from the forced operation pre-release state S5 to the normal control state S10 by an approach of the object to the forklift truck 10, for example. At this time, when the forced operation actual-release condition is satisfied by both the condition G21 and the condition G22 being satisfied, the condition A3 being satisfied may be prevented and the travel start limitation with respect to a newly detected object may not work. In contrast, when the condition G21 is satisfied even in the failure in satisfying the condition G22, the main controller 31 is shifted to the normal control state S10, which causes the travel start limitation with respect to the newly detected object to easily work.

The forced operation actual-release condition being satisfied may correspond to one of the conditions G1, G2, G12 and the following condition G13 being satisfied.

Condition G13 ... Both the condition G22 and the following condition G23 are satisfied.

Condition G23 ... A state in which the detection result of the direction sensor 35 indicates the forward travel has been continued for a specified time.

The specified time in the condition G23 is the same as that in the condition G21. The forced operation actual-release condition is satisfied when one of the condition G12 and the condition G13 is satisfied, which shifts the state of the main controller 31 to the normal control state S10 with the same operation regardless of the traveling direction of the forklift truck 10 in the forward direction or the reverse direction. Specifically, the main controller 31 is shifted to the normal control state S10 regardless of whether the avoidance operation in the forward direction or the reverse direction has continued for the specified time. The operator is simply required to perform the same operation in order to shift the state of the main controller 31 to the normal control state S10 regardless of whether the forklift truck 10 travels in the forward direction or the reverse direction, which improves operability.

The forced operation actual-release condition being satisfied may correspond to one of the conditions G1, G2, G21, and G23 being satisfied. In this case, when one of the condition G21 and the condition G23 is satisfied even in failure in satisfying the condition G22, the main controller 31 is shifted to the normal control state S10. Accordingly, the travel start limitation with respect to the newly detected object easily works. The operator is simply required to perform the same operation in order to shift the state of the main controller 31 to the normal control state S10 regardless of whether the forklift truck 10 travels in the forward direction or the reverse direction, which improves operability.

The forced operation actual-release condition being satisfied may correspond to one of the conditions G1, G2, and G12 being satisfied, or one of the conditions G1, G2, and G21 being satisfied.

The forced operation actual-release condition being satisfied may correspond to one of the conditions G1, G2, G11, G12, and G13 being satisfied. In this case, the condition G11 is satisfied when the condition G13 is satisfied, and the condition G13 is substantially unfunctional. This case can obtain the same effect as a case where the forced operation actual-release condition being satisfied corresponds to one of the conditions G1, G2, G11, and G12 being satisfied.

The forced operation condition may be the steering wheel operation by the operator. Whether or not the steering wheel has been operated can be determined from the detection result of a steering wheel angle sensor that detects the angle of the steering wheel or the steering angle sensor 36. That is, any forced operation condition is allowable as long as it can be determined that the operator has recognized the presence of an object in the travel start limitation area AA1.

Determination of the stop or the traveling of the forklift truck 10, such as the condition A3 of the travel start limitation condition, may be made by information other than the vehicle speed calculated by the main controller 31. For example, after the object detector 51 determines whether or not the forklift truck 10 stops, the main controller 31 may acquire such determination result of the object detector 51 and determine whether the forklift truck 10 stops or is traveling. When the object detector 51 determines whether or not the forklift truck 10 stops, the determination is made by determining whether or not a change between consecutive frames occurs in an image captured by the stereo camera 52. When the forklift truck 10 is traveling, a change between consecutive frames occurs in pixels on the image captured by the stereo camera 52. Thus, it is determined whether or not a change between consecutive frames occurs in the image, which can determine whether or not the forklift truck 10 stops. It can be determined whether or not the forklift truck 10 stops based on various factors such as a state in which the accelerator 16 is not operated for a predetermined time or more.

In the travel start limitation state S2, the alarm 58 need not issue an alarm to the operator.

In the travel start prohibition state S3, the alarm 58 need not intensify the alarm, and the same alarm as in the travel start limitation state S2 may be issued. In the travel start prohibition state S3, the alarm 58 need not issue an alarm.

In the forced operation state S4, the alarm 58 need not issue a softer alarm as compared with the travel start prohibition state S3, and the same alarm as the travel start prohibition state S3 may be performed. In the forced operation state S4, the alarm 58 need not issue an alarm.

In the travel limitation control, the pre-travel limitation state S11 may be omitted. In this case, the alarm area need not be set.

The alarms in the pre-travel limitation state S11 and the pre-limitation start state S22 may also be issued at a time of switchback of the forklift truck 10.

In the travel limitation state S12, the alarm 58 need not issue the alarm.

The pre-limitation start state S22 may be omitted in at least one of the vehicle speed limitation control for the person and the vehicle speed limitation control for the obstacle. In this case, the pre-alarm area need not be set.

The alarm 58 need not issue an alarm in all the states of the travel start limitation control, the travel limitation control, the vehicle speed limitation control for the person, and the vehicle speed limitation control for the obstacle. In this case, the forklift truck 10 need not have the alarm 58.

The travel start limitation area AA1 may be divided into four or more areas.

The right-left dimension of the central area N may be slightly longer or shorter than the dimension of the forklift truck 10 in the vehicle width direction.

The steering angle of the set of the steering wheels 14 may be calculated using the detection result of the steering wheel angle sensor. The steering wheel angle sensor detects the angle of the steering wheel and outputs the detection result to the main controller 31. Since the steering angle is controlled depending on the detection result of the steering wheel angle sensor, the steering angle can be detected from the detection result of the steering wheel angle sensor.

The object detector 51 may detect the position of an object being present in the forward direction as the traveling direction of the forklift truck 10. In this case, the stereo camera 52 faces the front of the forklift truck 10. When the object detector 51 detects the position of the object being present in the forward direction of the forklift truck 10, the automatic deceleration area AA2 and the travel start limitation area AA1 correspond to areas extending forward from the forklift truck 10. The travel start limitation control, the travel limitation control, the vehicle speed limitation control for a person, and the vehicle speed limit control for an obstacle may function when the forklift truck 10 is traveling forward. Specifically, a speed limit is imposed on the forklift truck 10 depending on the position of the object by reversing the "rear" and the "front" defined in the embodiment in each of the travel start limitation control, the travel limitation control, the vehicle speed limitation control for the person, and the vehicle speed limitation control for the obstacle when the forklift truck 10 is traveling forward. When the object detector 51 detects the position of the object being present in the forward direction as the traveling direction of the forklift truck 10, the main controller 31 derives the expected trajectory T extending in the forward direction.

The object detector 51 may be a detector capable of detecting the position of an object being present in either the reverse direction or the forward direction as the traveling direction of the forklift truck 10. In this case, one object detector 51 may detect the object being present in either the reverse direction or the forward direction as the traveling direction of the forklift truck 10, and an object detector 51 used for the forward direction and an object detector 51 used for the reverse direction may be provided. In the detection of the position of an object being present in either the reverse direction or the forward direction as the traveling direction of the forklift truck 10, when the forklift truck 10 is traveling forward, the vehicle speed is limited by the object being present in the forward direction. When the forklift truck 10 is traveling rearward, the vehicle speed is limited by the object being present in the reverse direction. That is, it can be said that the main controller 31 sets the vehicle speed upper limit when the forklift truck 10 is traveling in a direction approaching the object detected by the object detector 51.

When the vehicle speed is limited regardless of whether the forklift truck 10 is traveling in the forward direction or the reverse direction, the forced operation actual-release condition being satisfied preferably corresponds to one of the conditions G1, G2, G12, and G13 being satisfied. In this case, the condition G23 may be changed as follows.

Condition G23 ... A state in which the detection result of the direction sensor 35 indicates the forward direction and an area where an object is present does not match an extending direction of an expected trajectory has been continued for a specified time.

It can be said that the main controller 31 determines whether a state in which an expected trajectory extending toward the front of the forklift truck 10 does not match an area where the object is present in front of the forklift truck 10 has been continued for a specified time.

The object detector 51 may use a Time of Flight camera (ToF), a Laser Imaging Detection and Ranging (LIDAR), a millimeter wave radar, or the like, instead of the stereo camera 52. The ToF camera includes a camera and a light source that emits light, and derives the distance in the depth direction for each pixel of the image captured by the camera, based on a time until reception of the reflected light of the light emitted from the light source. The LIDAR is a rangefinder capable of recognizing a surrounding environment by emitting laser while changing an irradiation angle and receiving the light reflected from an object irradiated with the laser. The millimeter wave radar can recognize the surrounding environment by irradiating surroundings with radio waves in a predetermined frequency band. The stereo camera 52, the ToF camera, the LIDAR, and the millimeter wave radar are sensors capable of measuring three-dimensional coordinates in the world coordinate system. The object detector 51 preferably includes a sensor capable of measuring three-dimensional coordinates. When the object detector 51 has the sensor capable of measuring three-dimensional coordinates, the obstacle detector 55 can determine whether an object is a person or an obstacle using the person determiner in which a machine learning is provided in advance. The object detector 51 may include combination of a plurality of sensors such as the stereo camera 52 and the LIDAR.

The object detector 51 may have, instead of the stereo camera 52, a sensor capable of measuring coordinates of the object on an X-Y plane which is a coordinate surface representing a horizontal plane. That is, a sensor capable of measuring two-dimensional coordinates of the object may be used. This type of sensor may be, for example, a two-dimensional LIDAR that emits laser while changing the irradiation angle in the horizontal direction.

The stereo camera 52 may be equipped with three or more cameras.

The obstacle detector 55 may use a comparison image among images captured by the stereo camera 52 to determine whether the object is a person or an obstacle. Since the coordinates of the object are derived from the reference image, a deviation depending on a baseline length occurs in the derivation of the coordinates of the object on the comparison image from the coordinates of the object. Thus, the obstacle detector 55 corrects the coordinates of the object on the comparison image depending on the baseline length, and performs a person detection process on the corrected coordinates.

The alarm 58 may be provided in a device other than the object detector 51.

The alarm 58 may be operated directly by the main controller 31.

The forklift truck 10 may be driven by an engine which is a drive device. In this case, the drive controller 43 is a device that controls a fuel injection amount for the engine and the like.

The forklift truck 10 may be a four-wheel forklift truck 10. In this case, the main controller 31 derives the expected trajectory T from a formula and a map for deriving the expected trajectory T of the four-wheel forklift truck 10. That is, the formula and the map for deriving the expected trajectory T are changed depending on types of the industrial vehicle.

The operation of the forklift truck 10 may be switched between an automatic operation and a manual operation.

The forklift truck 10 may be remotely controlled by an operator who does not ride the forklift truck 10.

The forklift truck 10 may have a configuration in which two driving wheels 12 and 13 are rotated with one driving motor.

The expected trajectory derivation unit and the vehicle speed upper limit setting unit may be provided separately from the main controller 31. In this case, the expected trajectory derivation unit and the vehicle speed upper limit setting unit, and the main controller 31 are connected through the bus 60, and the main controller 31, the expected trajectory derivation unit and the vehicle speed upper limit setting unit are configured to acquire information from each other.

The main controller 31, the drive controller 43, and the object detector 51 may be configured to acquire information from each other with a wireless device.

The industrial vehicle may be any vehicle that is used for works in a limited area, such as a towing vehicle used for transporting cargos or an order picker used for picking work. That is, the industrial vehicle need not be equipped with the cargo handling apparatus 20 for unloading and loading.

REFERENCE SIGNS LIST

AA1 travel start limitation area
AA2 automatic deceleration area
10 forklift truck as industrial vehicle
20 cargo handling apparatus
31 main controller as expected trajectory derivation unit and vehicle speed upper limit setting unit
37 lifting height sensor
38 weight sensor
41 driving motor as drive device
43 drive controller
51 object detector
55 obstacle detector as determiner

The invention claimed is:

1. An industrial vehicle comprising:
a motor;
a drive controller configured to control the motor; and
a main controller configured to transmit a command to the drive controller,
the drive controller configured to control the motor in response to the command of the main controller to cause the industrial vehicle to travel, wherein, the industrial vehicle further includes:
a sensor configured to detect a position of an object being present in a traveling direction of the industrial vehicle; and
the main controller is further configured to:
derive an expected trajectory as a trajectory on which the industrial vehicle is expected to pass based on an operation state of a steering wheel, an accelerator, and a direction lever of the industrial vehicle; and
impose a speed limit on the industrial vehicle by setting a vehicle speed upper limit when the object detected by the sensor is positioned within the expected trajectory and the industrial vehicle is traveling in a direction approaching the object, and
transmit the command to the drive controller so that the vehicle speed of the industrial vehicle does not exceed the vehicle speed upper limit.

2. The industrial vehicle according to claim 1, wherein an automatic deceleration area is set within an object detectable range of the sensor, and
when the object is present within the automatic deceleration area and within the expected trajectory, the main controller is further configured to sets the vehicle speed upper limit at a lower value, as compared with a value of the vehicle speed upper limit when the object is present within the automatic deceleration area and outside the expected trajectory.

3. The industrial vehicle according to claim 2, wherein the sensor includes a determiner configured to determine whether the object is a person or an obstacle other than the person, and
when the object is determined as a person, the main controller is further configured to sets the vehicle speed upper limit at a lower value, as compared with a case where the object is determined as an obstacle.

4. The industrial vehicle according to claim 1, wherein a travel start limitation area is set within the object detectable range of the sensor, and
the main controller is further configured to sets the vehicle speed upper limit at zero when the industrial vehicle stops and the object is present within the travel start limitation area and within the expected trajectory.

5. The industrial vehicle according to claim 1, wherein the main controller is configured to extends a dimension of the expected trajectory in the traveling direction as the vehicle speed increases.

6. The industrial vehicle according to claim 1, wherein the main controller is further configured to derives the expected trajectory from a steering angle of the industrial vehicle.

7. The industrial vehicle according to claim 1, comprising a cargo handling apparatus on which a cargo is loaded.

8. The industrial vehicle according to claim 7, comprising a weight sensor configured to detect a weight of the cargo loaded on the cargo handling apparatus, wherein
the main controller is further configured to lowers the vehicle speed upper limit as the weight of the cargo increases.

9. The industrial vehicle according to claim 7, comprising a lifting height sensor configured to detect a lifting height of the cargo handling apparatus, wherein
the main controller is further configured to lowers the vehicle speed upper limit as the lifting height of the cargo handling apparatus increases.

10. The industrial vehicle according to claim 1, wherein when the vehicle turns toward a right direction, the main controller is configured to extend the right edge of the predicted trajectory in the right direction so as to increase a width and an area of the predicted trajectory, and wherein when the vehicle turns toward a left direction, the main controller is configured to extend the left edge of the predicted trajectory in the left direction so as to increase the width and the area of the predicted trajectory.

11. An industrial vehicle comprising:
a motor;
a drive controller configured to control the motor; and
a main controller configured to transmit a command to the drive controller,
the drive controller configured to control the motor in response to the command of the main controller to cause the industrial vehicle to travel, wherein,
the industrial vehicle further includes:
a sensor configured to detect a position of an object being present in a traveling direction of the industrial vehicle;
at least one memory configured to store computer program code; and
at least one processor configured to access said at least one memory and operate as instructed by said computer program code, said computer program code including:
expected trajectory derivation code configured to cause said at least one processor to derive an expected trajectory as a trajectory on which the industrial vehicle is expected to pass based on an operation state of a steering wheel, an accelerator, and a direction lever of the industrial vehicle; and
vehicle speed upper limit setting code configured to cause said at least one processor to impose a speed limit on the industrial vehicle by setting a vehicle speed upper limit when the object detected by the sensor is positioned within the expected trajectory and the industrial vehicle is traveling in a direction approaching the object, and
the main controller transmits the command to the drive controller so that the vehicle speed of the industrial vehicle does not exceed the vehicle speed upper limit.

12. The industrial vehicle according to claim 11, wherein when the vehicle turns toward a right direction, the one or more processors are configured to extend the right edge of the predicted trajectory in the right direction so as to increase a width and an area of the predicted trajectory, and wherein when the vehicle turns toward a left direction, the one or more processors are configured to extend the left edge of the predicted trajectory in the left direction so as to increase the width and the area of the predicted trajectory.

* * * * *